(12) United States Patent
Abe et al.

(10) Patent No.: US 11,192,728 B2
(45) Date of Patent: Dec. 7, 2021

(54) PLACEMENT DEVICE AND PLACEMENT METHOD

(71) Applicant: TOYOTA JIDOSHA KABUSHIKI KAISHA, Toyota (JP)

(72) Inventors: Nobuhira Abe, Miyoshi (JP); Yuto Narita, Miyoshi (JP); Yuichi Ito, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 108 days.

(21) Appl. No.: 16/833,928

(22) Filed: Mar. 30, 2020

(65) Prior Publication Data

US 2020/0354166 A1 Nov. 12, 2020

(30) Foreign Application Priority Data

May 8, 2019 (JP) .............................. JP2019-088613

(51) Int. Cl.
| | |
|---|---|
| *B65G 59/02* | (2006.01) |
| *B65G 47/90* | (2006.01) |
| *B65G 47/244* | (2006.01) |
| *B65G 54/02* | (2006.01) |
| *B65G 57/03* | (2006.01) |
| *B65G 47/61* | (2006.01) |
| *B65G 47/91* | (2006.01) |

(52) U.S. Cl.
CPC .......... *B65G 59/02* (2013.01); *B65G 47/244* (2013.01); *B65G 47/61* (2013.01); *B65G 47/901* (2013.01); *B65G 47/905* (2013.01); *B65G 47/907* (2013.01); *B65G 47/91* (2013.01); *B65G 54/02* (2013.01); *B65G 57/03* (2013.01); *B65G 2203/0233* (2013.01); *B65G 2203/041* (2013.01); *B65G 2811/0621* (2013.01); *B65H 2405/55* (2013.01)

(58) Field of Classification Search
CPC ...... B65G 54/02; B65G 47/244; B65G 47/20; B65G 47/24; B65G 47/61; B65G 47/901; B65G 47/905; B65G 47/907; B65G 47/91; B65G 57/03; B65G 2203/0233; B65G 2203/041
See application file for complete search history.

(56) References Cited

U.S. PATENT DOCUMENTS

| 8,960,410 B2* | 2/2015 | Rebaud .................. B65H 5/10 198/464.4 |
| 9,878,815 B2* | 1/2018 | Zuccotti .................... B65B 7/28 |
| 10,106,339 B2* | 10/2018 | Prussmeier ............ H02K 16/04 |

(Continued)

FOREIGN PATENT DOCUMENTS

| JP | 2011258418 A | 12/2011 |
| JP | 2012227124 A | 11/2012 |

(Continued)

*Primary Examiner* — William R Harp
(74) *Attorney, Agent, or Firm* — Dickinson Wright, PLLC

(57) ABSTRACT

A main mover and sub mover are made to run while changing a relative distance of the sub mover with respect to the main mover to change contact positions of cams and cam followers based on a holding position of a sheet member detected by a position detection device to thereby change a position in a horizontal plane of a holder and correct a holding position of the sheet member held at the holder to a preset reference position.

7 Claims, 21 Drawing Sheets

(56) References Cited

U.S. PATENT DOCUMENTS

| | | | |
|---|---|---|---|
| 10,518,987 B2 * | 12/2019 | Marcantoni | B65C 9/045 |
| 10,737,403 B2 * | 8/2020 | Bauer | B65G 47/682 |
| 11,046,472 B2 * | 6/2021 | Campedelli | B65G 47/244 |
| 11,104,525 B2 * | 8/2021 | Campedelli | B65G 54/02 |
| 2014/0059875 A1 | 3/2014 | Yuhara et al. | |

FOREIGN PATENT DOCUMENTS

| | | |
|---|---|---|
| JP | 2013222601 A | 10/2013 |
| JP | 2020140892 A | 9/2020 |

\* cited by examiner (A) RESTRAINING STATE      (B) NON-RESTRAINING STATE

FIG. 17
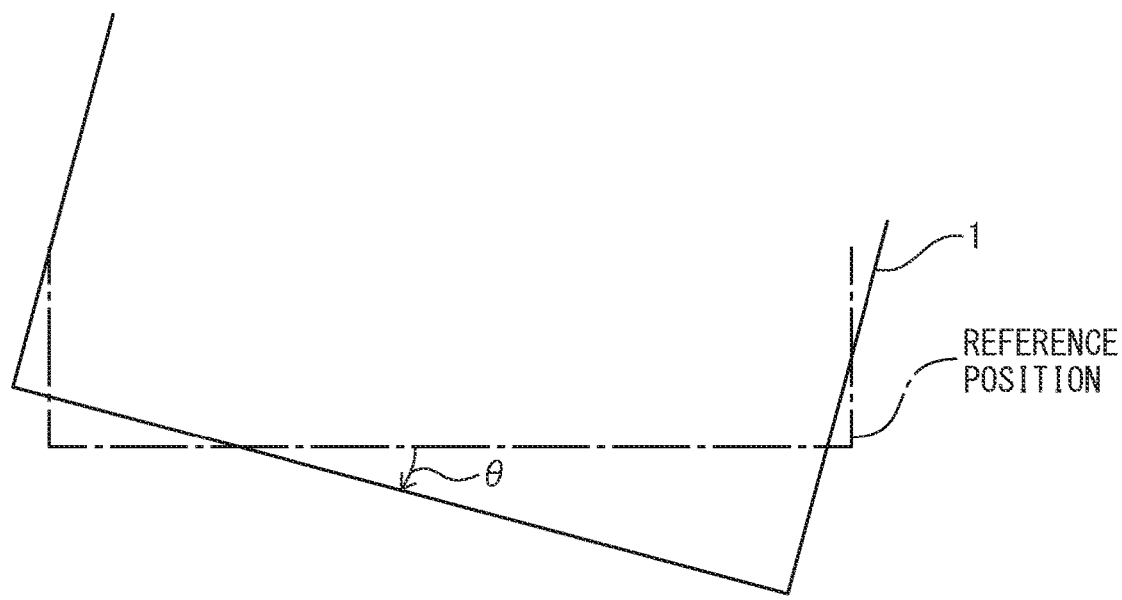
(A)
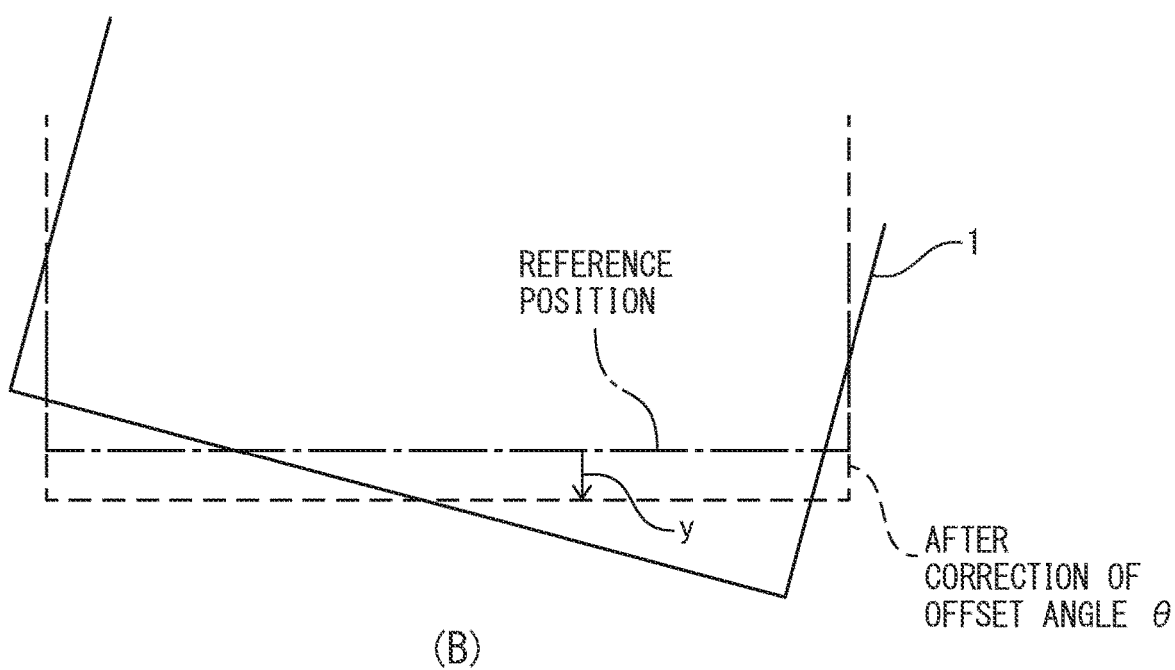
(B)

PLACEMENT DEVICE AND PLACEMENT METHOD

FIELD

The present disclosure relates to a placement device and placement method.

BACKGROUND

Japanese Unexamined Patent Publication No. 2012-227124 describes to use a camera to detect the position of a sheet member held by a holder (vacuum pickup head) able to move three-dimensionally in an up-down direction, conveyance direction, and width direction and able to rotate in a horizontal plane and to make the holder move or rotate based on the position information of the sheet member detected by the camera so as to correct the position of the sheet member while conveying and moving the sheet member by the holder.

SUMMARY

However, the above-mentioned Japanese Unexamined Patent Publication No. 2012-227124 does not disclose anything regarding the specific position correction method or conveyance method when conveying a sheet member by a holder. On the other hand, to improve the production efficiency of a stack manufactured using sheet members, improvement of the conveyance speed of the sheet members has been sought.

The present disclosure was made considering the above such problems and has as its object to enable a sheet member held by a holder to be conveyed at a high speed while correcting the holding position during conveyance.

To solve the above problem, according to one aspect of the present disclosure, there is provided a placement device configured to take out and convey a topmost layer sheet member from among a plurality of sheet members set in a pre-stacked state and to place the taken out sheet member at a placement station arranged below a conveyance route in a vertical plane. This placement device comprises a rail configured to extend along the conveyance route, a main mover of a linear motor configured to run on the rail, a sub mover of the linear motor configured to run on the rail alongside the main mover, a holder configured to be able to hold a sheet member, a coupler configured to couple the main mover and the holder so as to be able to change a position of the holder in a horizontal plane, a transfer device configured to take out the topmost layer sheet member from the plurality of sheet members and transfer it to the holder, a position detection device configured to detect a position of the sheet member transferred to the holder and held by the holder, a cam fastened to the sub mover, extending toward the main mover side, and contacting a cam follower provided at the coupler, and an operation control device configured to make the main mover and sub mover run while changing a relative distance of the sub mover with respect to the main mover so as to change a contact position of the cam and cam follower based on the position of the sheet member detected by the position detection device and thereby change a position of the holder in a horizontal plane to correct offset from the reference position of the sheet member held at the holder.

Further, according to another aspect of the present disclosure, there is provided a placement method for taking out and conveying a topmost layer sheet member from among a plurality of sheet members set in a pre-stacked state and for placing the taken out sheet member at a placement station arranged below a conveyance route in a vertical plane. The placement method comprises a first process of taking out a topmost layer sheet member from the plurality of sheet members and transferring it to a holder attached to a main mover of a linear motor running on a rail, a second process of detecting a position of the sheet member transferred to the holder and calculating a position correction amount for correcting offset from a reference position of the sheet member transferred to the holder based on the detected position of the sheet member, and a third process of conveying the sheet member transferred to the holder by the main mover and placing it at the placement station during which changing a position of the holder in a horizontal plane based on the position correction amount by a sub mover of a linear motor running on the rail alongside the main mover to thereby correct the position of the sheet member transferred to the holder to the reference position.

According to these aspects of the present disclosure, it is possible to convey a sheet member held by a holder by a main mover of a linear motor at a high speed. Further, during conveyance by the main mover, a sub mover of a linear motor running alongside the main mover can be used to correct the position of the sheet member held by the holder. Therefore, it is possible to convey a sheet member held at a holder at a high speed while placing it corrected in its holding position during conveyance.

BRIEF DESCRIPTION OF DRAWINGS

FIG. 17 is a view explaining a method of calculation of a correction amount for correcting a sheet-shaped electrode transferred to a holder to a reference position.

DESCRIPTION OF EMBODIMENTS

Figure 1A:
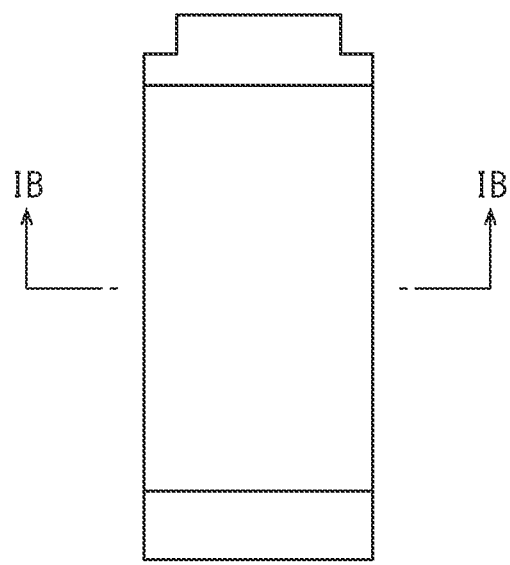
FIG. 1A is a plan view of a unit cell according to one embodiment of the present disclosure.
Figure 1B:
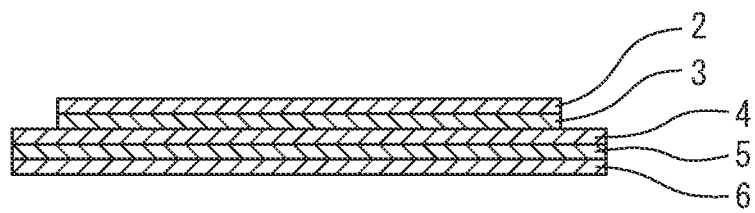
FIG. 1B is a cross-sectional view of a unit cell according to one embodiment of the present disclosure.

The present disclosure relates to a stack manufacturing apparatus of sheet-shaped electrodes. From a stack of such sheet-shaped electrodes, for example a battery mounted in a vehicle is formed. Therefore, first, to start, a sheet-shaped electrode forming this stack will be explained. FIG. 1A and FIG. 1B respectively schematically show a plan view of a component of a cell manufactured using this sheet-shaped electrode, that is, a unit cell, and a cross-sectional view of a unit cell seen along the line IB-IB of FIG. 1A. Note that, the thickness of a unit cell is 1 mm or less. Therefore, in FIG. 1B, the thicknesses of the layers are shown considerably exaggerated.

Figure 2:
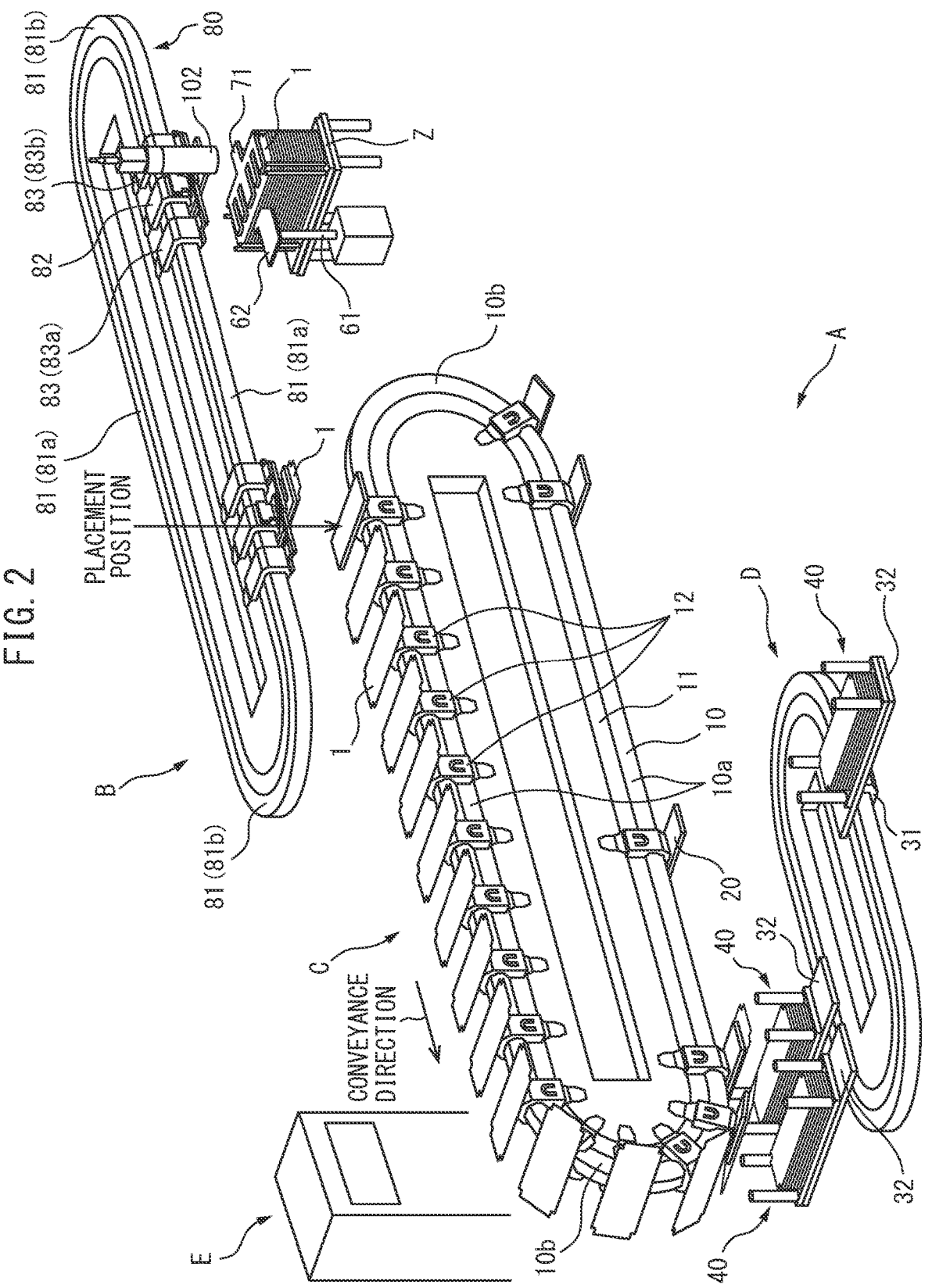
FIG. 2 is a perspective view of a stack manufacturing apparatus according to one embodiment of the present disclosure for manufacturing a stack including a sheet-shaped electrode.

Referring to FIG. 1B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The positive electrode current collector layer 2 is formed from a conductive material. In the present embodiment, this positive electrode current collector layer 2 is formed from metal foil for current collection use, for example, aluminum foil. Further, the positive electrode active material layer 3 is formed from a positive electrode active material able to store lithium ions, sodium ions, calcium ions, and other metal ions at the time of discharge and release them at the time of charging. Further, the solid electrolyte layer 4 is formed from a material having conductivity with respect to lithium ions, sodium ions, calcium ions, and other metal ions and able to be utilized as a material for an all solid battery.

On the other hand, the negative electrode active material layer 5 is formed from a negative electrode active material able to release lithium ions, sodium ions, calcium ions, and other metal ions at the time of discharge and store them at the time of charging. Further, the negative electrode current collector layer 6 is formed from a conductive material. In the present embodiment, this negative electrode current collector layer 6 is formed from a current collection use metal foil, for example, copper foil. Further, as will be understood from the above-mentioned explanation, a battery manufactured in the present embodiment is an all solid battery. In this case, this battery is preferably an all solid lithium rechargeable battery.

Figure 1C:
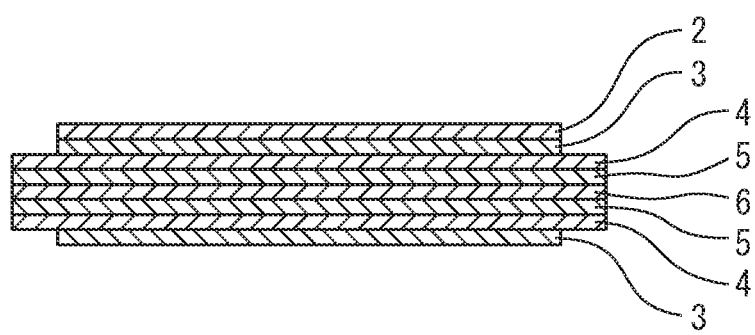
FIG. 1C is a cross-sectional view of a sheet-shaped electrode with a positive electrode according to one embodiment of the present disclosure.
Figure 1D:
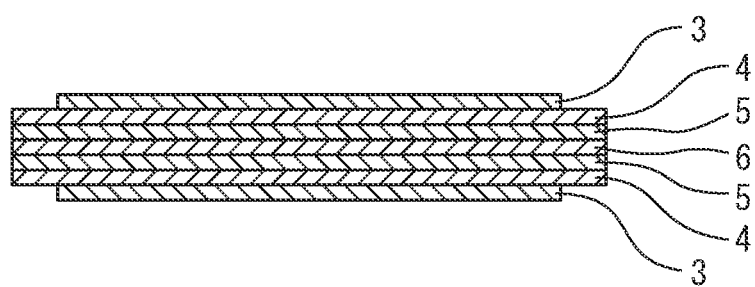
FIG. 1D is a cross-sectional view of a sheet-shaped electrode without a positive electrode according to one embodiment of the present disclosure.

Now then, the sheet-shaped electrode used in the present embodiment has a rectangular plan shape similar to FIG. 1A and has a cross-sectional structure shown in FIG. 1C or FIG. 1D. These FIG. 1C and FIG. 1D show cross-sectional views at positions similar to the line IB-IB of FIG. 1A. Note that, in these FIG. 1C and FIG. 1D as well, in the same way as FIG. 1B, 2 indicates a positive electrode current collector layer, 3 indicates a positive electrode active material layer, 4 indicates a solid electrolyte layer, 5 indicates a negative electrode active material layer, and 6 indicates a negative electrode current collector layer.

The sheet-shaped electrode shown in FIG. 1C has the negative electrode current collector layer 6 positioned at its center part. In the upward direction from this negative electrode current collector layer 6, a negative electrode active material layer 5, solid electrolyte layer 4, positive electrode active material layer 3, and positive electrode current collector layer 2 are successively formed. In the downward direction from the negative electrode current collector layer 6, a negative electrode active material layer 5, solid electrolyte layer 4, and positive electrode active material layer 3 are successively formed. In this case, in the present embodiment, the negative electrode current collector layers 6 are formed from copper foil, while the positive electrode current collector layers 2 are formed from aluminum foil.

On the other hand, the sheet-shaped electrode shown in FIG. 1D has a negative electrode current collector layer 6 positioned at its center part. From each of the upward direction and downward direction from this negative electrode current collector layer 6, a negative electrode active material layer 5, solid electrolyte layer 4, and positive electrode active material layer 3 are successively formed. That is, the sheet-shaped electrode shown in FIG. 1D does not have the positive electrode current collector layer 2. In the case shown in FIG. 1D as well, the negative electrode current collector layer 6 is formed from copper foil. In the present embodiment, a sheet-shaped electrode of a cross-sectional shape shown in FIG. 1D is formed in advance. As explained later, in the middle of the stacking process, aluminum foil (positive electrode current collector) 2 is bonded to the sheet-shaped electrode of the cross-sectional shape shown in FIG. 1D. As a result, the sheet-shaped electrode of the cross-sectional shape shown in FIG. 1C, that is, the sheet-shaped electrode with aluminum foil 2 bonded to it, is formed.

In the present embodiment, the sheet-shaped electrode to which this aluminum foil 2 is bonded is called the "sheet-shaped electrode 1". Note that, in the following explanation, if not considered particularly confusing, the sheet-shaped electrode of the cross-sectional shape shown in FIG. 1D to which no aluminum foil 2 is bonded will also be called a "sheet-shaped electrode 1". As opposed to this, if it is desirable to express differentiated the sheet-shaped electrode 1 to which aluminum foil 2 is bonded and the sheet-shaped electrode 1 to which aluminum foil 2 is not bonded, the sheet-shaped electrode to which aluminum foil 2 is bonded will be called a "sheet-shaped electrode 1 with a positive electrode", while the sheet-shaped electrode to which aluminum foil 2 is not bonded will be referred to as a "sheet-shaped electrode 1 without a positive electrode".

Note that, the sheet-shaped electrodes 1 shown in FIG. 1C and FIG. 1D show single illustrations. Use of various structures of sheet-shaped electrodes 1 may be considered. For example, on one surface of the copper foil 6, it is possible to form a negative electrode active material layer 5, solid electrolyte layer 4, positive electrode active material layer 3, and positive electrode current collector layer 2, to form a negative electrode active material layer 5, solid electrolyte layer 4, and positive electrode active material layer 3, to form a negative electrode active material layer 5 and solid electrolyte layer 4, or to form only a negative electrode active material layer 5, while on the other surface of the copper foil 6, it is possible to form a negative electrode active material layer 5 and solid electrolyte layer 4 or form only a negative electrode active material layer 5 or to not form anything. Further, instead of the copper foil 6, it is possible to use the aluminum foil for forming the positive electrode current collector layer 2 and form on one surface of this aluminum foil 2 a positive electrode active material layer 3, solid electrolyte layer 4, negative electrode active material layer 5, and negative electrode current collector layer 6, to form a positive electrode active material layer 3, solid electrolyte layer 4, and negative electrode active material layer 5, to form a positive electrode active material layer 3 and solid electrolyte layer 4, or to form only a positive electrode active material layer 3 and possible to form on the other surface a positive electrode active material layer 3, solid electrolyte layer 4, and negative electrode active material layer 5, to form a positive electrode active material layer 3 and solid electrolyte layer 4, to form only a positive electrode active material layer 3, or to not form anything at all in the structure.

Therefore, if expressing this comprehensively, in the present disclosure, the sheet-shaped electrode 1 includes metal foil 2 or 6 for current collection use and at least one of a positive electrode active material layer 3 and negative electrode active material layer 5 formed on the metal foil 2 or 6 for current collection use. Note that, below, embodiments of the present disclosure will be explained taking as an example the case of the sheet-shaped electrode 1 having a structure shown in any of FIG. 1C and FIG. 1D.

FIG. 2 is a perspective view of a stack manufacturing apparatus A according to the present embodiment for manufacturing a stack including a sheet-shaped electrode 1.

As shown in FIG. 2, the stack manufacturing apparatus A is provided with an electrode placement device B, electrode conveyance device C, jig conveyance device D, and operation control device E.

The electrode placement device B takes out one sheet-shaped electrode 1 without a positive electrode at a time from inside of a magazine (storage station) Z in which sheet-shaped electrodes 1 without positive electrodes are stored in a stacked state and conveys it to the placement position shown in FIG. 2 where it places the one taken out positive electrode sheet-shaped electrode 1 at the electrode conveyance device C. The sheet-shaped electrode 1 without a positive electrode placed at the electrode conveyance device C is conveyed by the electrode conveyance device C in the conveyance direction shown in FIG. 2 so as to form a stack including this sheet-shaped electrode 1 without a positive electrode.

Below, first, details of the electrode conveyance device C will be explained with reference to FIG. 3 to FIG. 6B in addition to FIG. 2.

Figure 3:
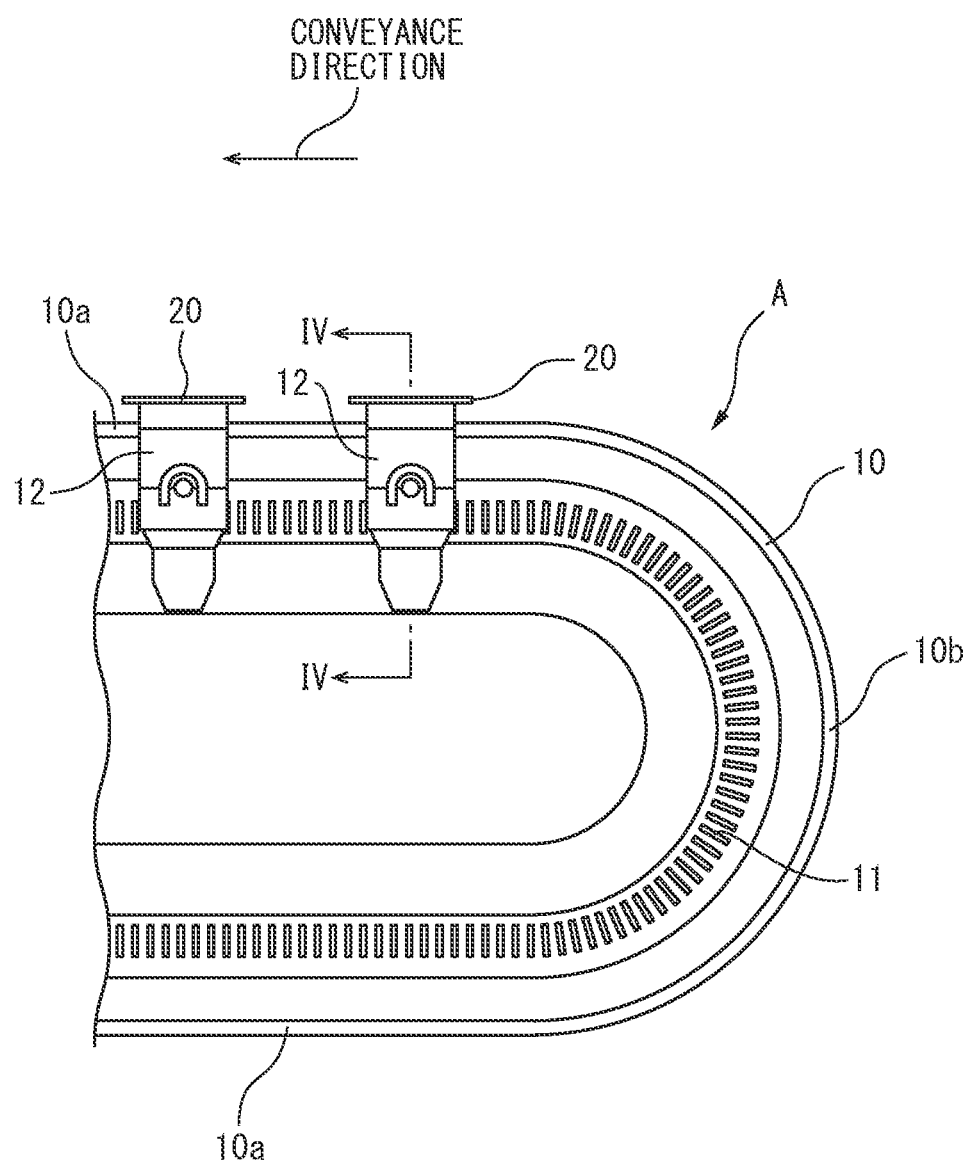
FIG. 3 is an enlarged side view of an electrode conveyance device according to one embodiment of the present disclosure.

FIG. 3 is an enlarged lateral view of part of the electrode conveyance device C.

As shown in FIG. 2 and FIG. 3, the electrode conveyance device C is provided with an elliptical shaped rail 10 comprised of horizontal straight parts 10a spaced apart from each other in the vertical direction in a vertical plane and a pair of semicircular parts 10b and a plurality of movers 12 able to move on this rail 10.

Figure 4:
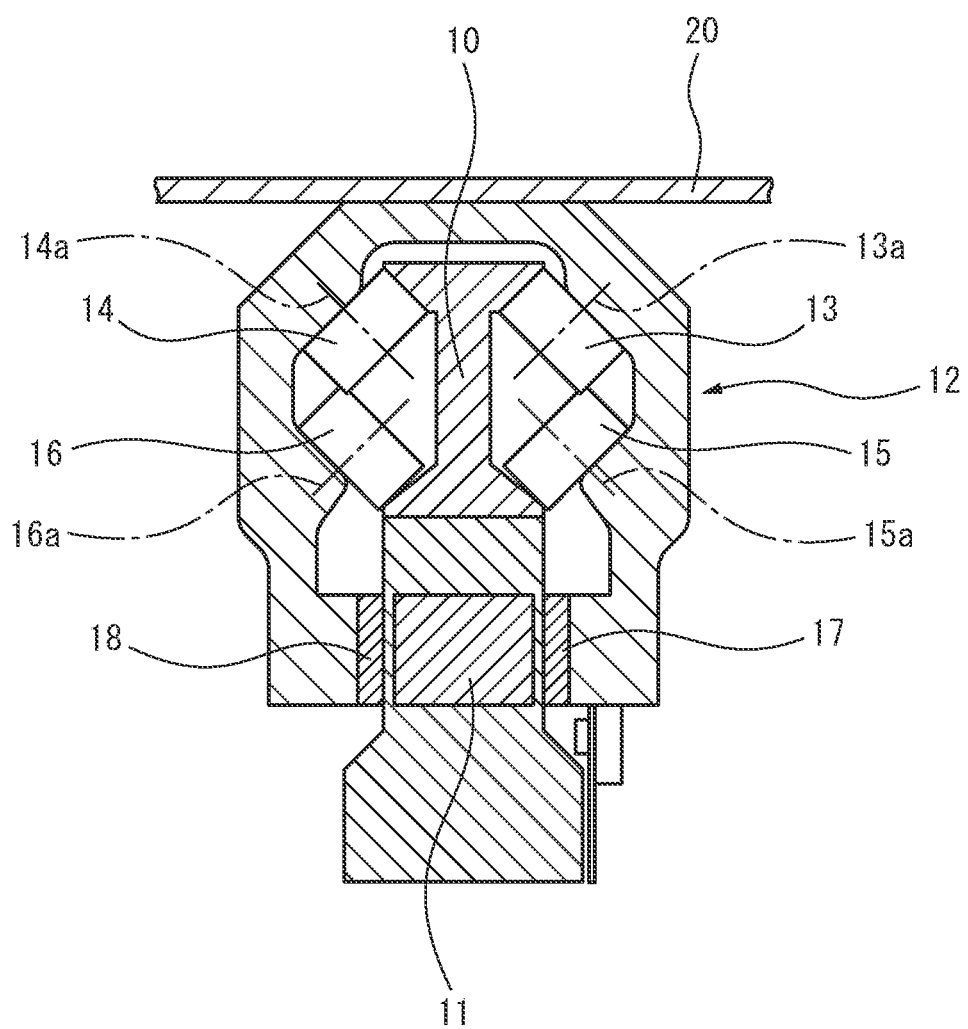
FIG. 4 is a cross-sectional view of a mover according to one embodiment of the present disclosure seen along a line IV-IV of FIG. 3.

FIG. 4 is a cross-sectional view of a mover 12 along the line IV-IV of FIG. 3.

As shown in FIG. 4, this mover 12 is provided with a pair of guide rollers 13 attached to the mover 12 to be able to rotate about axes 13a and roll on the rail 10 (arranged at the front and rear in the direction of advance), a pair of guide rollers 14 attached to the mover 12 to be able to rotate about axes 14a and roll on the rail 10 (arranged at the front and rear in the direction of advance), a guide roller 15 attached to the mover 12 to be able to rotate about an axis 15a and roll on the rail 10, and a guide roller 16 attached to the mover 12 to be able to rotate about an axis 16a and roll on the rail 10.

Further, the mover 12 is provided with a pair of permanent magnets 17 and 18. Inside of the electrode conveyance device C sandwiched between these permanent magnets 17 and 18, a stator 11 around which a coil is wound is arranged. This stator 11 and the permanent magnets 17 and 18, that is, the stator 11 and mover 12, form a linear motor. Therefore, in the electrode conveyance device C, the mover 12 of a linear motor is made to move on the rail 10. Each mover 12 of the electrode conveyance device C is, for example, numbered. Each mover 12 is respectively independently controlled in speed of movement and position etc. for each mover 12 by the operation control device E.

Further, on the mover 12, a rectangular shaped conveyor plate 20 is attached. On this conveyor plate 20, a sheet-shaped electrode 1 is placed.

Figure 5:
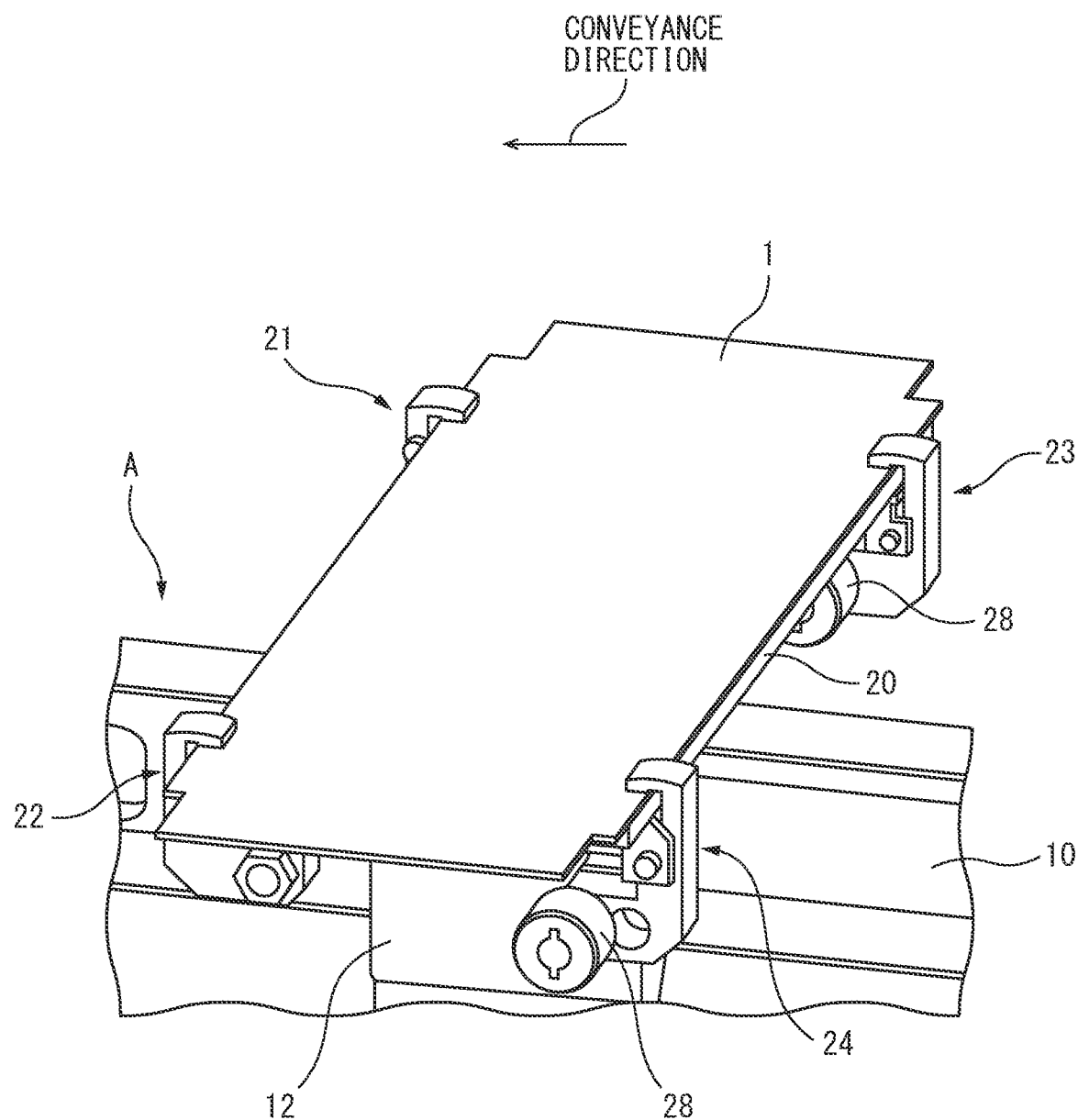
FIG. 5 is a perspective view of a conveyor plate according to one embodiment of the present disclosure attached to a mover.

FIG. 5 is a perspective view of the conveyor plate 20 attached to the mover 12.

As shown in FIG. 5, the conveyor plate 20 has a plurality of clamps 21, 22, 23, and 24 attached for clamping the sheet-shaped electrode 1 carried on the conveyor plate 20 against the conveyor plate 20 and holding the sheet-shaped electrode 1 at the placement position of the conveyor plate 20 during conveyance. In the present embodiment, a pair of clamps 21 and 22 are attached spaced apart from each other at the front end part of the conveyor plate 20 positioned at the front in the conveyance direction while a pair of clamps 23 and 24 are attached spaced apart from each other at the rear end part of the conveyor plate 20 positioned at the rear in the direction of advance.

These clamps 21, 22, 23, and 24 have the same structure. Therefore, the clamp 22 will be used as an example to explain the structure of the clamps.

Figure 6A:
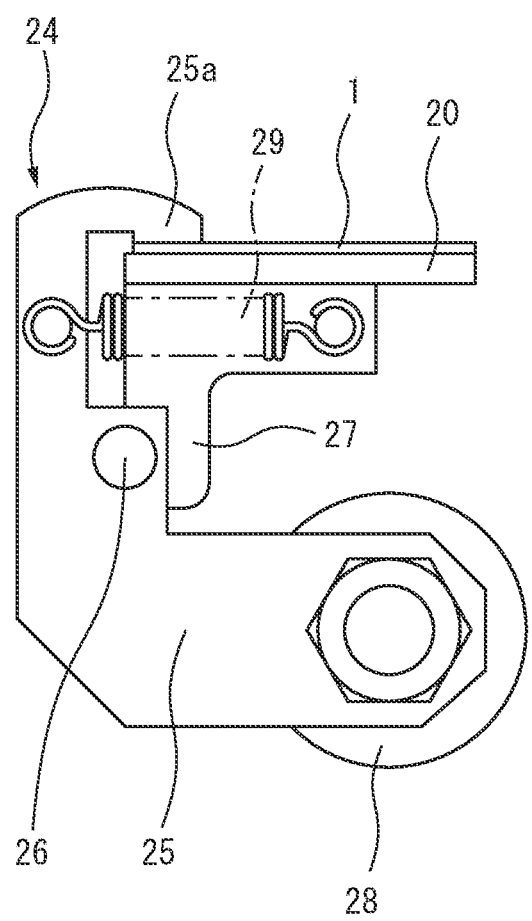
FIG. 6A is a view for explaining operation of a clamp of a conveyor plate.
Figure 6B:
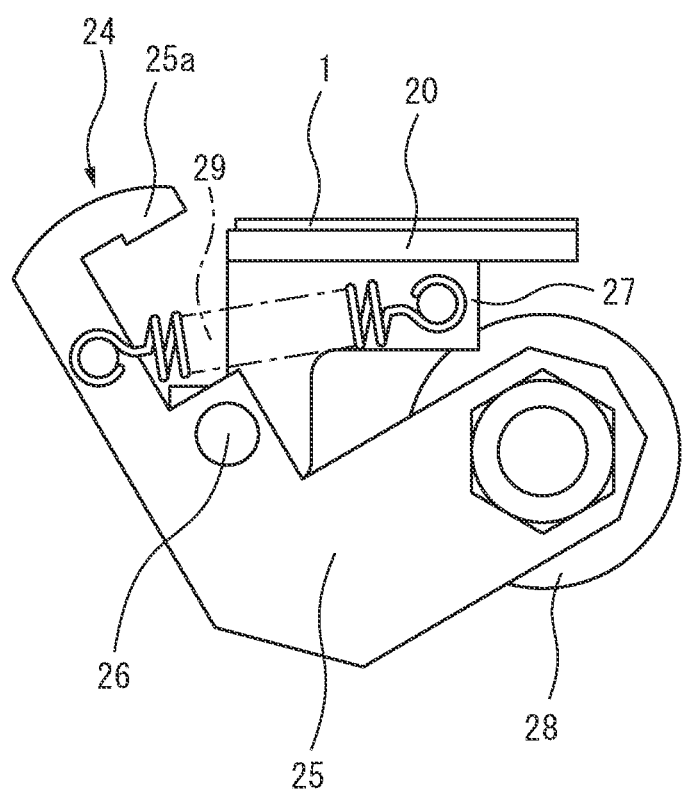
FIG. 6B is a view for explaining operation of a clamp of a conveyor plate.

FIG. 6A shows the time when the sheet-shaped electrode 1 is clamped against the conveyor plate 20 by the clamp 22, while FIG. 6B shows the time when the clamp 22 releases the sheet-shaped electrode 1.

As shown in FIG. 6A and FIG. 6B, the clamp 22 is provided with a clamp arm 25 forming a roughly speaking L-shape. The center part of this clamp arm 25 is attached by a support pin 26 to a support plate 27 fastened to the conveyor plate 20 to be able to rotate. One end of the clamp arm 25 is formed with a clamping part 25a extending to over the surface of the conveyor plate 20. The other end of the clamp arm 25 has a roller 28 attached to it. The clamp arm 25 is constantly biased clockwise by a tension spring 29 attached between the clamp arm 25 and support plate 27.

On the moving route of the mover 12, a fixed cam (not shown) able to engage with the roller 28 of the clamp arm 25 is provided. The roller 28 of the clamp arm 25 normally does not engage with this fixed cam. At this time, as shown in FIG. 6A, the sheet-shaped electrode 1 is clamped against the conveyor plate 20 by the clamping part 25a of the clamp arm 25 due to the spring force of the tension spring 29. On the other hand, if the roller 28 of the clamp arm 25 engages with the fixed cam, as shown in FIG. 6B, the roller 28 will rise and the sheet-shaped electrode 1 will be released from the clamping part 25a of the clamp arm 25.

Next, referring to FIG. 7, the process of stacking a sheet-shaped electrode 1 will be explained.

Figure 7:
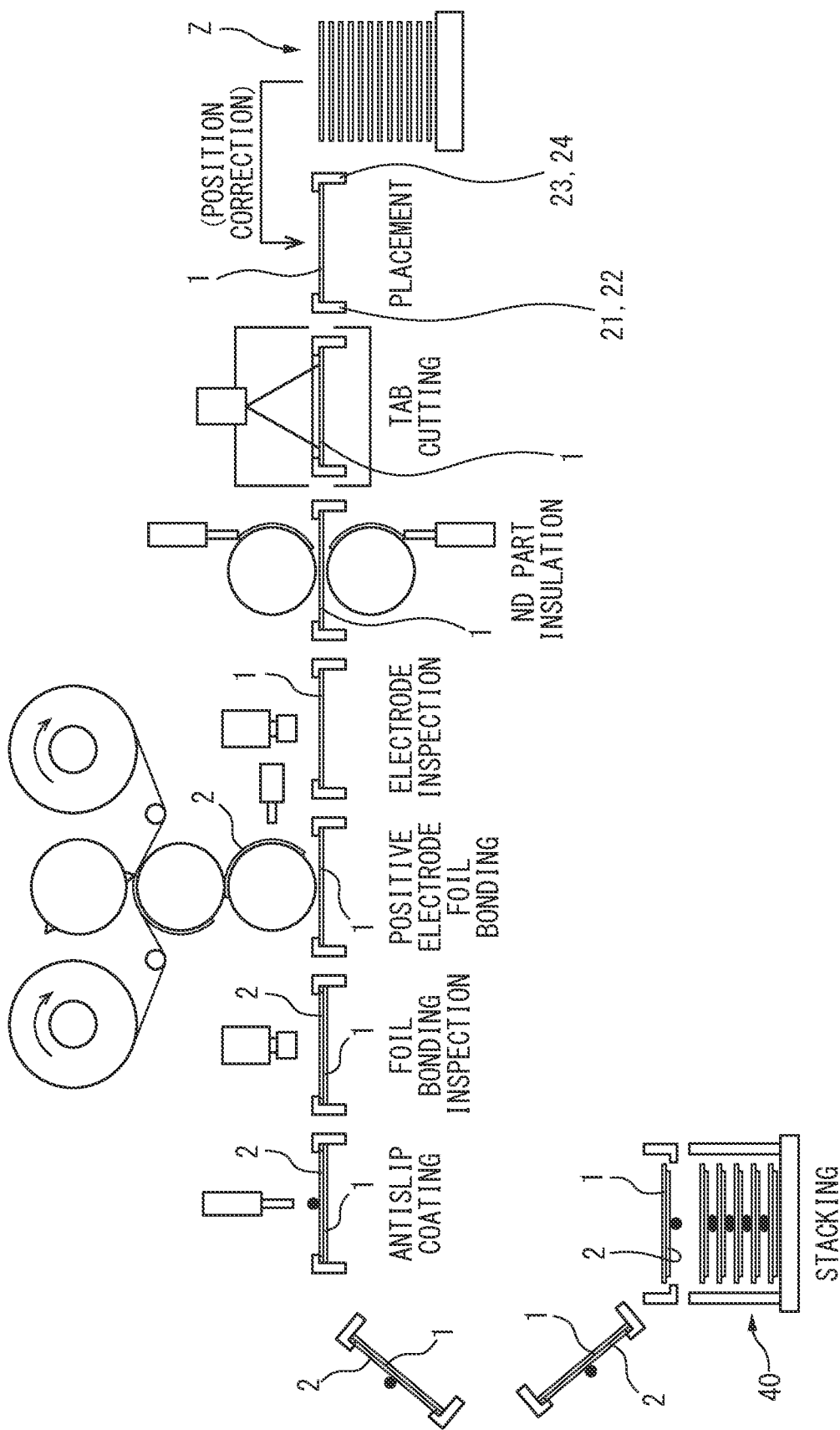
FIG. 7 is a view showing a stacking process of a sheet-shaped electrode.

FIG. 7 schematically shows this process of stacking sheet-shaped electrodes. This FIG. 7 schematically shows sheet-shaped electrodes 1 carried on conveyor plates 20 and clamps 21, 22, 23, and 24 attached to the conveyor plates 20. However, in FIG. 7, the conveyor plates 20 are omitted. Note that, this FIG. 7 shows various processings performed when sheet-shaped electrodes 1 are conveyed by the electrode conveyance device C.

In the present embodiment, the two surfaces of a long narrow copper foil are successively coated at intervals in the longitudinal direction of the copper foil with negative electrode active material layers, solid electrolyte layers, and positive electrode active material layers so as to be superposed on each other, then this copper foil is cut into predetermined lengths to thereby prepare sheet-shaped electrodes 1 without positive electrodes with the cross-sectional shapes shown in FIG. 1D. These sheet-shaped electrodes 1 without positive electrodes are stored stacked in a magazine Z. The sheet-shaped electrodes 1 stacked inside this magazine Z are successively taken out by the electrode placement device B at the above-mentioned placement position (see FIG. 2) one sheet at a time and placed on conveyor plates 20 in an upper horizontal straight part 10a of the electrode conveyance device C. At this time, while details will be explained later, the electrode placement device B is used to suitably correct the positions of the sheet-shaped electrodes 1 so that the sheet-shaped electrodes 1 are placed at suitable positions on the conveyor plates 20.

While a sheet-shaped electrode 1 carried on a conveyor plate 20 at the upper horizontal straight rail part 10a is moving along the horizontal straight part 10a of the sheet-shaped electrode conveyance device C, first, to start, an end part of the copper foil 6 is cut to form a connection use electrode tab as tab cutting processing. Next, to prevent a short-circuit with the aluminum (positive electrode) foil, end insulation processing is performed for coating part of the copper foil 6 with an insulating material. Next, the sheet-shaped electrode 1 without a positive electrode is inspected. Whether or not the connection use electrode tab is accurately formed and whether or not the insulating material is accurately coated is detected.

Next, aluminum (positive electrode) foil 2 is bonded on the sheet-shaped electrode 1 using an adhesive as positive electrode foil bonding processing. When the aluminum (positive electrode) foil 2 is bonded to the sheet-shaped electrode 1 carried on the conveyor plate 20, the sheet-shaped electrode 1 becomes the sheet-shaped electrode with a positive electrode of the cross-sectional shape shown in FIG. 1C. Next, whether the aluminum (positive electrode) foil 2 has been suitably bonded on the sheet-shaped electrode 1 is inspected as foil bonding inspection. Next, when stacking sheet-shaped electrodes 1 with positive electrodes, the aluminum (positive electrode) foil 2 is coated with an adhesive so that the stacked sheet-shaped electrodes 1 do not become offset as antislip coating processing.

Next, when the conveyor plate 20 reaches the semicircular part 10b of the electrode conveyance device C and starts to advance along the semicircular part 10b, as shown in FIG. 7, the conveyor plate 20 starts to be turned upside down. When the conveyor plate 20 reaches the bottom end part of the semicircular part 10b of the electrode conveyance device C, the conveyor plate 20 is turned completely upside down. In the present embodiment, the stacking action of the sheet-shaped electrodes 1 with positive electrodes is performed in the state with the conveyor plates 20 turned upside down. This stacking action will be explained later with reference to FIG. 8. Note that, when this stacking action is performed, the sheet-shaped electrodes 1 with positive electrodes are taken off from the conveyor plates 20 and the conveyor plates 20 become emptied. The conveyor plates 20 now in this empty state are successively moved to the placement position shown in FIG. 2.

Next, referring to FIG. 8, details of the jig conveyance device D will be explained while explaining the stacking action of sheet-shaped electrodes 1 with positive electrodes.

Figure 8:
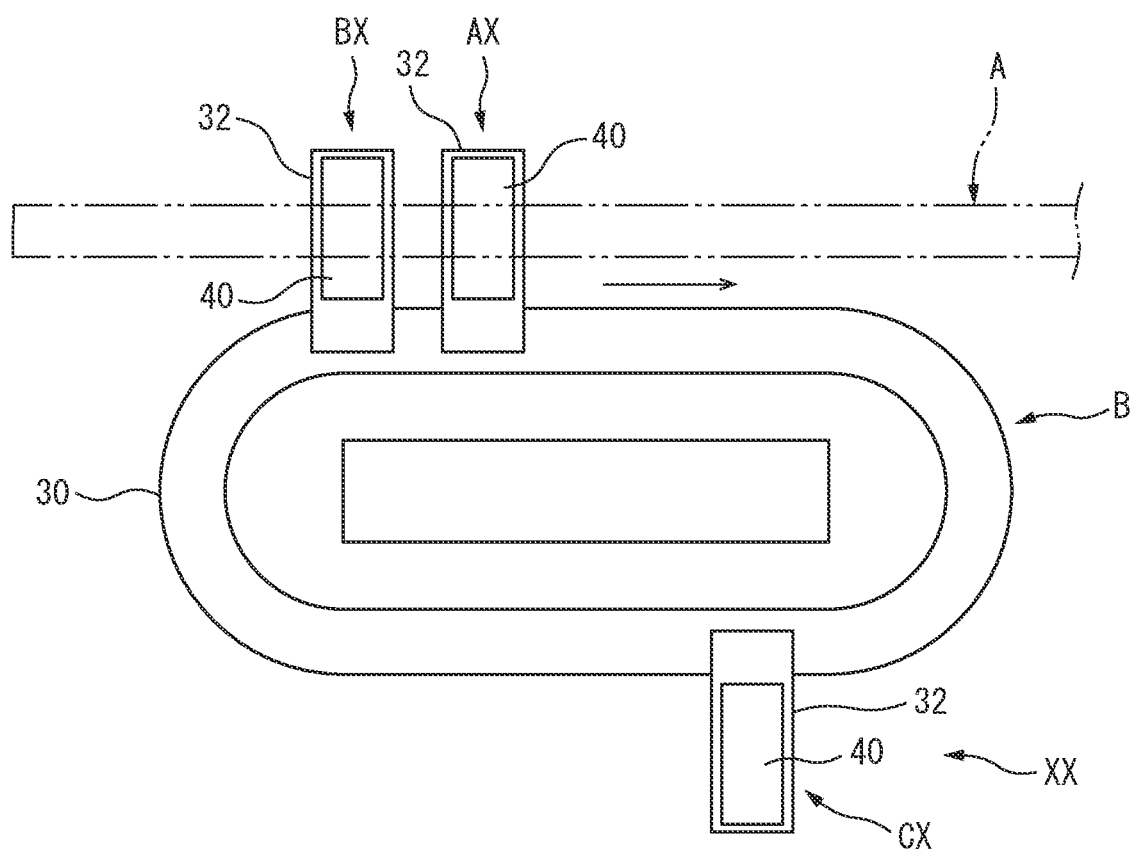
FIG. 8 is a plan view schematically showing a jig conveyance device and jig transport device.

FIG. 8 is a plan view schematically illustrating a jig conveyance device D. This FIG. 8 shows the electrode conveyance device C by a broken line.

Referring to FIG. 2 and FIG. 8, the jig conveyance device D is a smaller version of the electrode conveyance device C and has a similar function to the electrode conveyance device C. That is, the jig conveyance device D is provided with an elliptical shaped rail 30 comprised of a pair of straight parts arranged alongside each other and a pair of semicircular parts and movers 31 of linear motors running on this rail 30. The movers 31 have structures similar to the mover 12 shown in FIG. 4. At the movers 31, end parts of conveyor stations 32 extending from this elliptical shaped rail 30 outside in the horizontal direction are fixed. The conveyor stations 32 carry the stacking jigs 40.

Now then, as explained referring to FIG. 7, in the present embodiment, the stacking action of the sheet-shaped electrodes 1 with positive electrodes is performed in the state with the conveyor plates 20 turned upside down. At this time, as shown in FIG. 7, in the state with the top surface of the stacking jig 40 made to face a sheet-shaped electrode 1 placed on a conveyor plate 20, the clamping action of the clamps 21, 22, 23, and 24 of the conveyor plate 20 on the sheet-shaped electrode is released whereby the sheet-shaped electrode 1 placed on the conveyor plate 20 is made to drop to the inside of the stacking jig 40 and the sheet-shaped electrode 1 is stacked in the stacking jig 40. In this case, in the present embodiment, the conveyor plate 20 is made to move in the direction of advance while performing the stacking action, so while the stacking action is being performed, the stacking jig 40 is conveyed so that the top surface of the stacking jig 40 continues to face a sheet-shaped electrode 1 placed on a conveyor plate 20.

At the movers 31 of the jig conveyance device D, the end parts of conveyor stations 32 are fixed. On the conveyor stations 32, stacking jigs 40 are placed. Therefore, in the present embodiment, the jig conveyance device D is arranged so that while the stacking action is being performed, the top surfaces of the stacking jigs 40 can continue to face sheet-shaped electrodes 1 placed on conveyor plates 20, that is, so that while the stacking action is being performed, the stacking jigs 40 placed on the conveyor stations 32 can continue to move directly under the electrode conveyance device C. Furthermore, in the present embodiment, the conveyor plates 20 and conveyor stations 32 are made to move in synchronization so that while the stacking action is being performed, the top surfaces of the stacking jigs 40 can continue to face the sheet-shaped electrodes 1 placed on the conveyor plates 20.

In the example shown in FIG. 8, the jig conveyance device D has three conveyor stations 32 supported by movers 31. On the conveyor stations 32, stacking jigs 40 are carried. These conveyor stations 32 are made to move by the movers 31 in the arrow direction. In FIG. 8, for example, when the work of stacking a sheet-shaped electrode 1 placed on a certain conveyor plate 20 to a stacking jig 40 is performed for the stacking jig 40 on the conveyor station 32 shown by AX, the work of stacking a sheet-shaped electrode 1 on the stacking jig 40 from the conveyor plate 20 following this conveyor plate 20 is performed for the stacking jig 40 on the conveyor station 32 shown by BX. On the other hand, the stacking jig 40 of the conveyor station 32 shown by CX shows the stacking jig where the work of stacking the sheet-shaped electrode 1 on the stacking jig 40 has already been completed. When the work of stacking the sheet-shaped electrode 1 on the stacking jig 40 has been completed, the conveyor station 32 is made to move by a high speed to behind the preceding conveyor station 32, in FIG. 8, the conveyor station 32 shown by BX.

The sheet-shaped electrodes 1 successively conveyed by the conveyor plates 20 in this way are successively stacked one at a time inside the stacking jigs 40 of the successively conveyed conveyor stations 32. The work of stacking these sheet-shaped electrodes 1 at the stacking jigs 40 is performed at a high speed. Therefore, stacks of preset numbers of sheet-shaped electrodes 1 are formed at the stacking jigs 40 in a short time. When stacks of the preset number of sheet-shaped electrodes 1 are produced, the stacking jigs 40 are removed from the conveyor stations 32 of the jig conveyance device D while holding the stacks of the sheet-shaped electrodes 1 for the next processing and empty stacking jigs 40 are placed on the conveyor stations 32.

The stacking jigs 40 removed from the conveyor stations 32 of the jig conveyance device D are transported to a not shown press device where the work of compressing the stacks of sheet-shaped electrodes 1 is performed. Next, in the state with the stacks of sheet-shaped electrodes 1 compressed, the lateral parts of the stacks of the sheet-shaped electrodes 1 are coated with resin whereby the lateral parts of the sheet-shaped electrodes 1 are fastened to each other by the resin. Next, aluminum (positive electrode) foil 2 is bonded to the sheet-shaped electrodes 1 using an adhesive as processing for bonding the positive electrode foil. Next, the electrode tabs for connection use of the sheet-shaped electrodes 1 are bonded with terminals for taking out electric power as processing for connecting terminals. Due to this, an electrode stack of the sheet-shaped electrodes 1 is formed. The thus formed electrode stack is, for example, covered by a laminate film in a bag like manner. The plurality of electrode stacks covered by laminate films in a bag like manner are electrically connected in series or in parallel so as to form a battery to be mounted in, for example, a vehicle.

Here, as explained before referring to FIG. 7, in the present embodiment, the sheet-shaped electrodes 1 placed on the conveyor plates 20 of the electrode conveyance device C are processed for cutting out tabs, processed for insulating the ends, processed for attaching a positive electrode foil, or otherwise processed in various ways where precision is demanded while the conveyor plate 20 is made to move along the horizontal straight part 10a.

For this reason, if not using the electrode placement device B to place the sheet-shaped electrodes 1 at suitable positions on the conveyor plates 20, the various types of processing to be performed after that would not be suitably performed and defective products would be liable to end up being manufactured. That is, if a sheet-shaped electrode 1 ends up being placed on a conveyor plate 20 at a position offset from a preset reference position, the position at which the electrode tab for connection use are formed, the position at which the insulating material is coated, and the part where the positive electrode foil is bonded will become offset by the amount of offset of position, so defective products would be liable to end up being manufactured.

Further, to improve the production efficiency of a stack including sheet-shaped electrodes 1, it is necessary to improve the speed of placement of the sheet-shaped electrodes 1 by the electrode placement device B.

Therefore, the electrode placement device B according to the present embodiment is configured so that such position offset does not occur, that is, so that a sheet-shaped electrode 1 can be moved at a high speed to a suitable position on a conveyor plate 20. Below, referring to FIG. 9 to FIG. 17 in addition to FIG. 2, details of the electrode placement device B according to the present embodiment will be explained.

Figure 9:
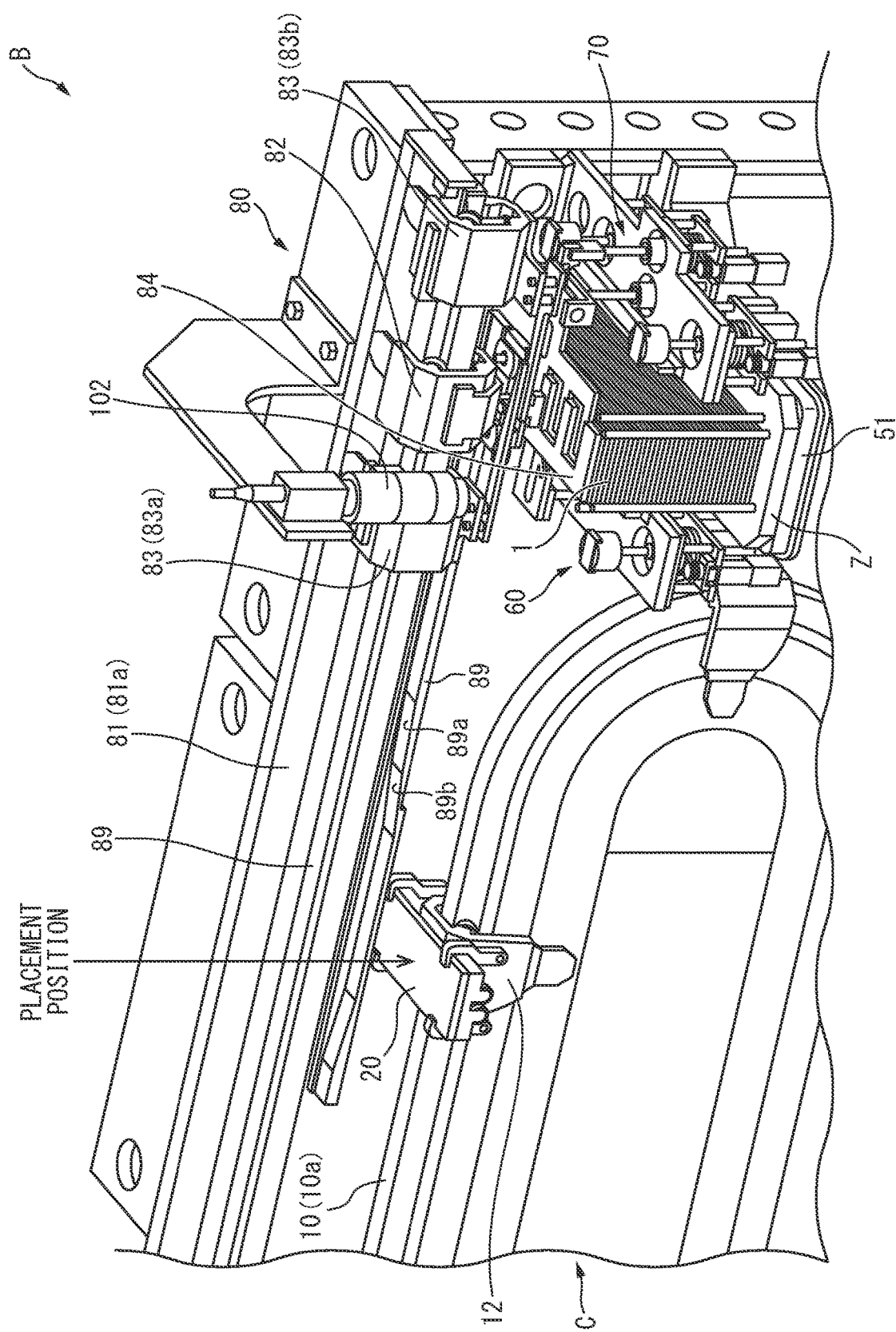
FIG. 9 is a perspective view enlarging part of the electrode placement device according to one embodiment of the present disclosure.

FIG. 9 is a perspective view enlarging part of the electrode placement device B according to the present embodiment.

The electrode placement device B is a system for taking out one by one a plurality of sheet-shaped electrodes 1 without positive electrodes stored in a stacked state inside a magazine Z and placing them at suitable positions on conveyor plates 20 provided at movers 12 of the electrode conveyance device C. It is provided with a restraining device 60 provided at one lateral side of the magazine installation part 51 where the magazine Z is installed (in FIG. 9, the left side), a transfer device 70 provided at the other lateral side of the magazine installation part 51 (in FIG. 9, the left side), and a correction and conveyance device 80 provided above the restraining device 60 and transfer device 70. Below, the detailed configuration of these devices will be explained.

First, referring to FIG. 10 to FIG. 12 in addition to FIG. 9, details of the restraining device 60 will be explained.

Figure 10:
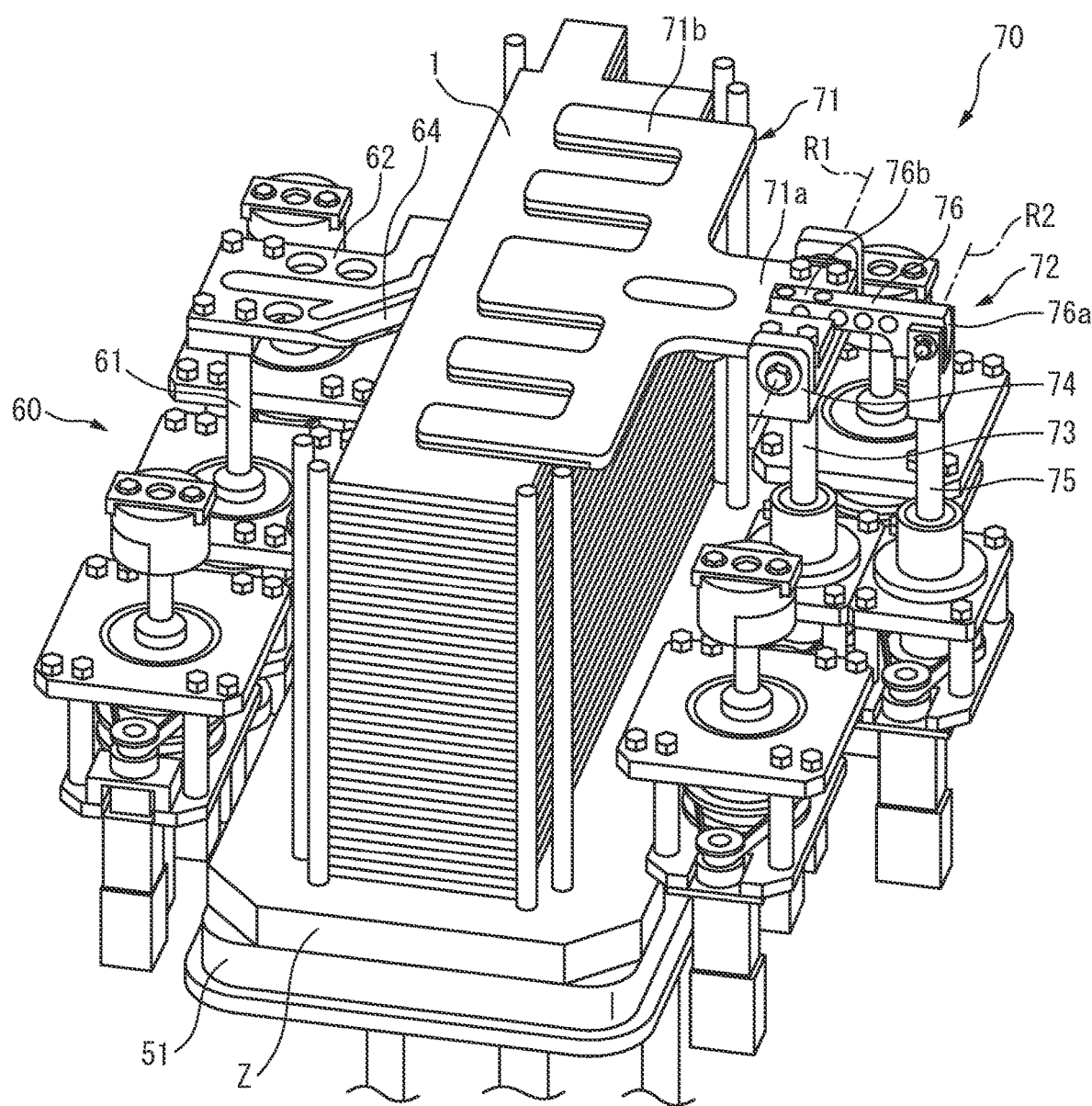
FIG. 10 is an enlarged perspective view of a restraining device and transfer device according to one embodiment of the present disclosure.
Figure 11:
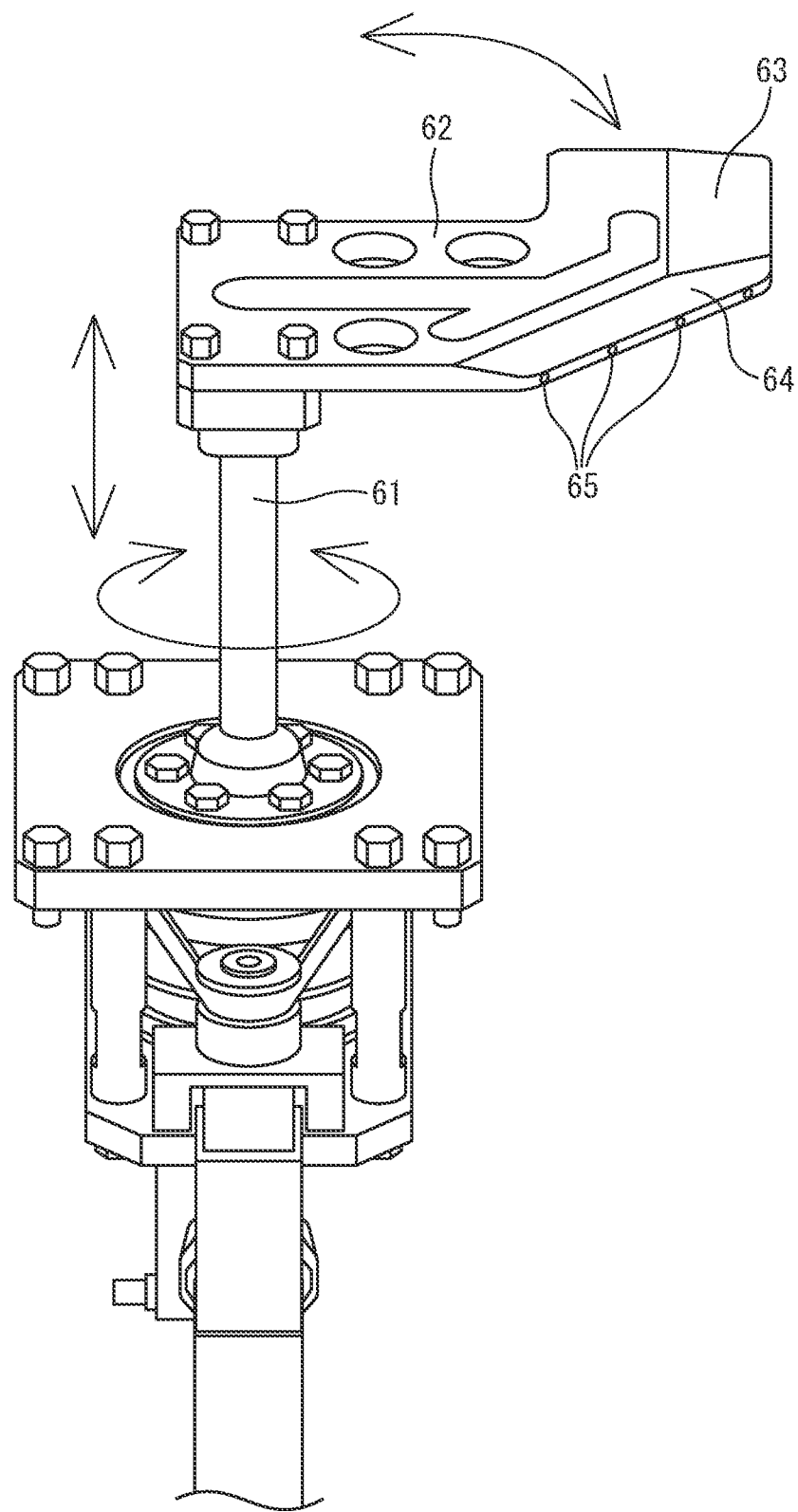
FIG. 11 is a front perspective view of the restraining device according to one embodiment of the present disclosure.

FIG. 10 is an enlarged perspective view of the restraining device 60 and transfer device 70. FIG. 11 is a front perspective view of the restraining device 60.

The restraining device 60 is a device for restraining the sheet-shaped electrodes 1 stacked in the magazine Z from above in the stacking direction so that the plurality of sheet-shaped electrodes 1 stored inside the magazine Z in the stacked state do not tip over. As shown in FIG. 10 and FIG. 11, it is provided with a shaft 61 and a restraining blade 62.

The shaft 61 is set so that its axial direction becomes parallel to the height direction of the magazine, that is, the stacking direction of the sheet-shaped electrodes 1 stacked inside the magazine. The shaft 61 is configured to be able to extend and contract along its axial direction and to be able to be made to rotate about its axis in both directions.

The restraining blade 62 is a schematically L-shaped plate-shaped member. Its base end side is fixed to the front end of the shaft 61 so that it can rotate together with the shaft 61. Further, as shown in FIG. 11, the front end side of the restraining blade 62 is made a tapered shape gradually becoming thinner in thickness. At the front end side of this restraining blade 62, a restraining part 63 and air discharge part 64 explained later referring to FIG. 12 are formed.

Figure 12:
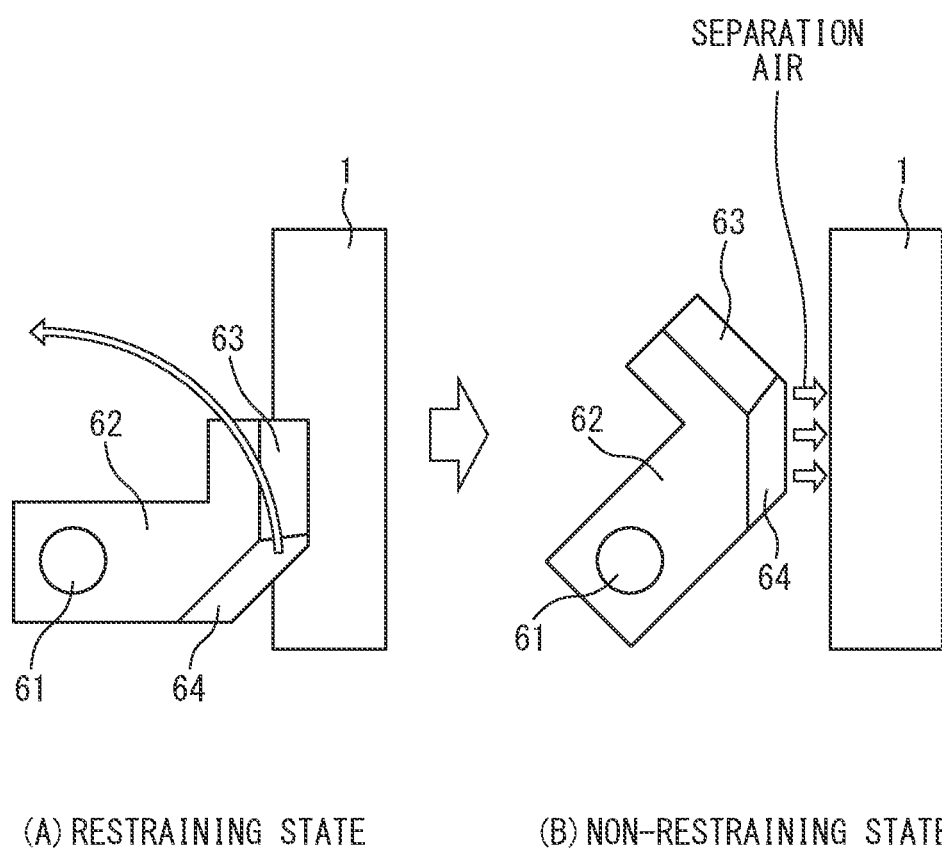
FIG. 12 is a view for explaining operation of the restraining device according to one embodiment of the present disclosure.

FIG. 12 is a view for explaining the operation of the restraining device 60. FIG. 12(A) shows the restrained state where the restraining part 63 of the restraining blade 62 restraoms the sheet-shaped electrodes 1 stacked inside the magazine from above in the stacking direction, while FIG. 12(B) shows the non-restrained state where the shaft 61 is made to rotate counterclockwise by about 45 degrees from the restrained state of FIG. 12(A) to thereby make the restraining part 63 of the restraining blade 62 retract from the sheet-shaped electrodes 1 and release the restraining action of the restraining blade 62 on the sheet-shaped electrodes 1.

As shown in FIG. 12(A), the restraining part 63 of the restraining blade 62 is a part formed at the front end side of the restraining blade 62 so that in the restrained state, it is arranged in parallel with the longitudinal direction of the sheet-shaped electrodes 1 stacked inside the magazine and it is arranged above the sheet-shaped electrodes 1.

On the other hand, as shown in FIG. 12(B), the air discharge part 64 of the restraining blade 62 is a part formed at the front end side of the restraining blade 62 so as to be arranged in parallel with a longitudinal direction of the sheet-shaped electrodes 1 stacked in the magazine in a state with a predetermined distance open from the sheet-shaped electrodes 1 stacked inside the magazine Z when in the non-restrained state. At the front ends of the teeth of the air discharge part 64 of the restraining blade 62, as shown in FIG. 11, a plurality of air discharge ports 65 are formed. It is possible to discharge separation air from the air discharge ports 65 toward the sheet-shaped electrodes 1 stacked inside the magazine Z for assisting take out when taking out a single topmost layer sheet-shaped electrode 1 from among the sheet-shaped electrodes 1 in the stacked state.

Next, referring to FIG. 10, details of the transfer device 70 will be explained.

The transfer device 70 is a device for taking out the single topmost layer sheet-shaped electrode 1 stacked inside the magazine Z and transferring it to the holder 84 of the later explained correction and conveyance device 80 and is provided with a transfer plate 71 and plate adjustment mechanism 72 adjusting the height and angle of the transfer plate 71.

The transfer plate 71 is provided with a base end part 71a supported by the plate adjustment mechanism 72 and a comb tooth shaped pickup and holding part 71b at which a plurality of recesses are formed for picking up and holding the topmost layer sheet-shaped electrode 1 stacked inside the magazine Z from above in the stacking direction. At the rear surface of the pickup and holding part 71b (surface facing the sheet-shaped electrode 1), a plurality of vacuum pickup ports (not shown) are provided so as to be able to pick up and hold a sheet-shaped electrode 1 by vacuum.

The plate adjustment mechanism 72 is provided with a first shaft 73, a plate supporter 74, a second shaft 75, and a connecting arm 76.

The first shaft 73 is set so that its axial direction becomes parallel to the height direction of the magazine. The first shaft 73 is configured to be able to extend and contract along its axial direction. At the front end of this first shaft 73, the plate supporter 74 supporting the transfer plate 71 by holding its base end part 71a is attached.

The plate supporter 74 holds the two side surfaces of the base end part 71a of the transfer plate 71 so that the transfer plate 71 rotates about the rotational axis R1 substantially parallel to its longitudinal direction.

The second shaft 75 is set parallel to the first shaft 73 at a position further from the magazine Z than the first shaft 73. The second shaft 75, like the first shaft 73, is configured to be able to extend and contract along its axial direction.

The connecting arm 76 is a rod-shaped member for connecting the second shaft 75 and the transfer plate 71. One end part 76a of the connecting arm 76 is attached to the front end of the second shaft 75 so that the connecting arm 76 can rotate about the rotational axis R2 substantially parallel to the longitudinal direction of the transfer plate 71. On the other hand, the other end part 76b of the connecting arm 76 is fixed to a connecting pin (not shown) arranged coaxially with the rotational axis R1 at the center of the base end part 71a of the transfer plate 71 and is designed to not be able to rotate about the rotational axis R1.

Due to this, it is possible to shift from a state where the transfer plate 71 is rendered a horizontal state such as shown in FIG. 10 to an inclined state where the transfer plate is made to incline from the horizontal direction by making the length of the second shaft 75 shorter than the length of the first shaft and lifting up one end side of the transfer plate 71 in the short direction (restraining device 60 side). Further, at the other end side of the transfer plate 71 in the short direction (transfer device 70 side), it is possible to restrain the sheet-shaped electrodes 1 stacked inside the magazine Z from above in the stacking direction by the base end side of the pickup and holding part 71b of the transfer plate 71 rendered the inclined state.

Next, referring to FIG. 2, FIG. 9, and FIG. 13 to FIG. 17, details of the correction and conveyance device 80 will be explained.

The correction and conveyance device 80 is a device for receiving a sheet-shaped electrode 1 picked up and held at the transfer plate 71 of the transfer device 70 from the transfer plate 71 and arranging the sheet-shaped electrode 1 at a suitable position on a conveyor plate of the electrode conveyance device C at the placement position (see FIG. 2 and FIG. 9).

As shown in FIG. 2, the correction and conveyance device 80 is provided with an elliptical shaped rail 81 having a pair of horizontal straight parts 81a arranged alongside each other in a horizontal plane and a pair of semicircular parts 81b. The rail 81 is arranged in parallel with the horizontal straight parts 10a of the rail 10 of the electrode conveyance device C above them in a vertical plane of the horizontal straight parts 10a so that parts of the horizontal straight parts 81a are positioned above the placement position of the electrode conveyance device C.

Figure 13:
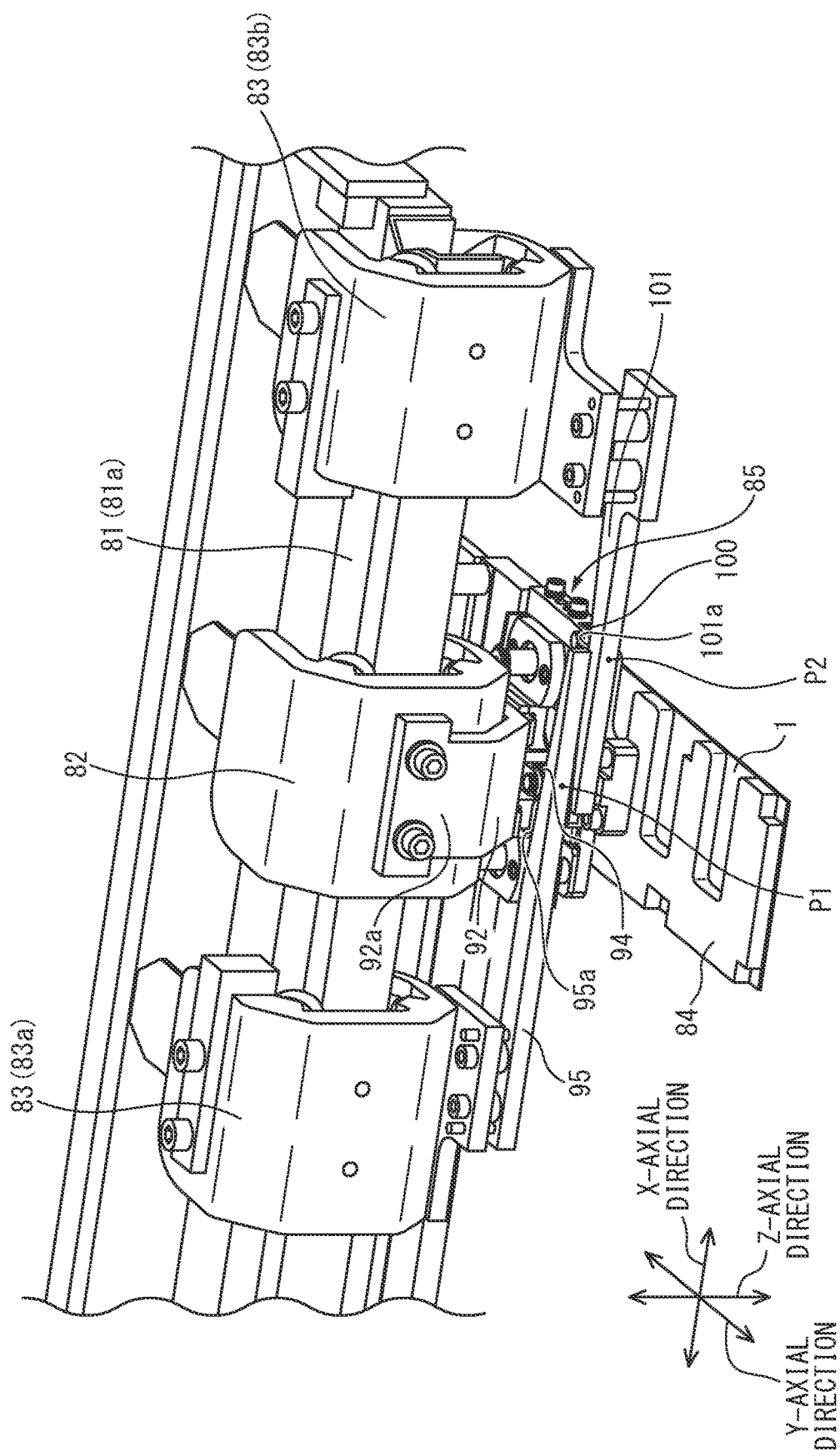
FIG. 13 is a view showing enlarged a main mover and a pair of sub movers running on a rail of the electrode placement device according to one embodiment of the present disclosure.

At the rail 81, in the same way as the electrode conveyance device C, main movers 82 of linear motors running on the rail 81 and pairs of sub movers 83 of linear motors positioned at the left and right of the main movers and running on the rail so as to run alongside the main movers 82 are attached. FIG. 13 is a view showing enlarged a main mover 82 and a pair of sub movers 83 running on this rail 81.

The structures of the main movers 82 and sub movers 83 are also similar to the movers 12 shown in FIG. 4. Further, the main movers 82 and sub movers 83 are also, for example, numbered. The main movers 82 and sub movers 83 are also controlled by the operation control device E independently in running speeds, positions, etc. In the following explanation, if necessary, one of a pair of sub movers 83 will be called the "first sub mover 83a" and the other will be called the "second sub mover 83b".

As shown in FIG. 13, at the main mover 82, a holder 84 for receiving a sheet-shaped electrode 9 picked up and held at the transfer plate 71 of the transfer device 70 is held by the coupler 85.

The holder 84 is a plate-shaped member of a comb tooth shape configured to be able to pick up and hold a sheet-shaped electrode 1 picked up and held at the transfer plate 71 from the top side in the same way as the transfer plate 71. It is shaped so that when facing the transfer plate 71 in a horizontal plane, it meshes with the comb teeth formed at the pickup and holding part 71*b* of the transfer plate 71. At the rear surface of the holder 84 (surface facing sheet-shaped electrode 1), in the same way as the transfer plate 71, a plurality of vacuum ports (not shown) are provided to enable the sheet-shaped electrode 1 to be picked up and held.

The coupler 85 holding the holder 84 is configured to be able to make the holder 84 move up and down in a vertical plane and further to be able to make the holder 84 move in the longitudinal direction of the holder and rotate in a horizontal plane. That is, the coupler 85, as shown in FIG. 13, is configured so that when designating the line parallel to the direction of advance of the main mover 82 running on the rail 81 as the X-axis, the line perpendicularly intersecting the X-axis in the horizontal plane as the Y-axis, and the line perpendicularly intersecting the X-axis in the vertical plane as the Z-axis, it can make the holder 84 move in the Y-axis direction and Z-axis direction and further can make it rotate about the Z-axis. Below, referring to FIG. 14 to FIG. 16, details of this coupler 85 will be explained.

Figure 14:
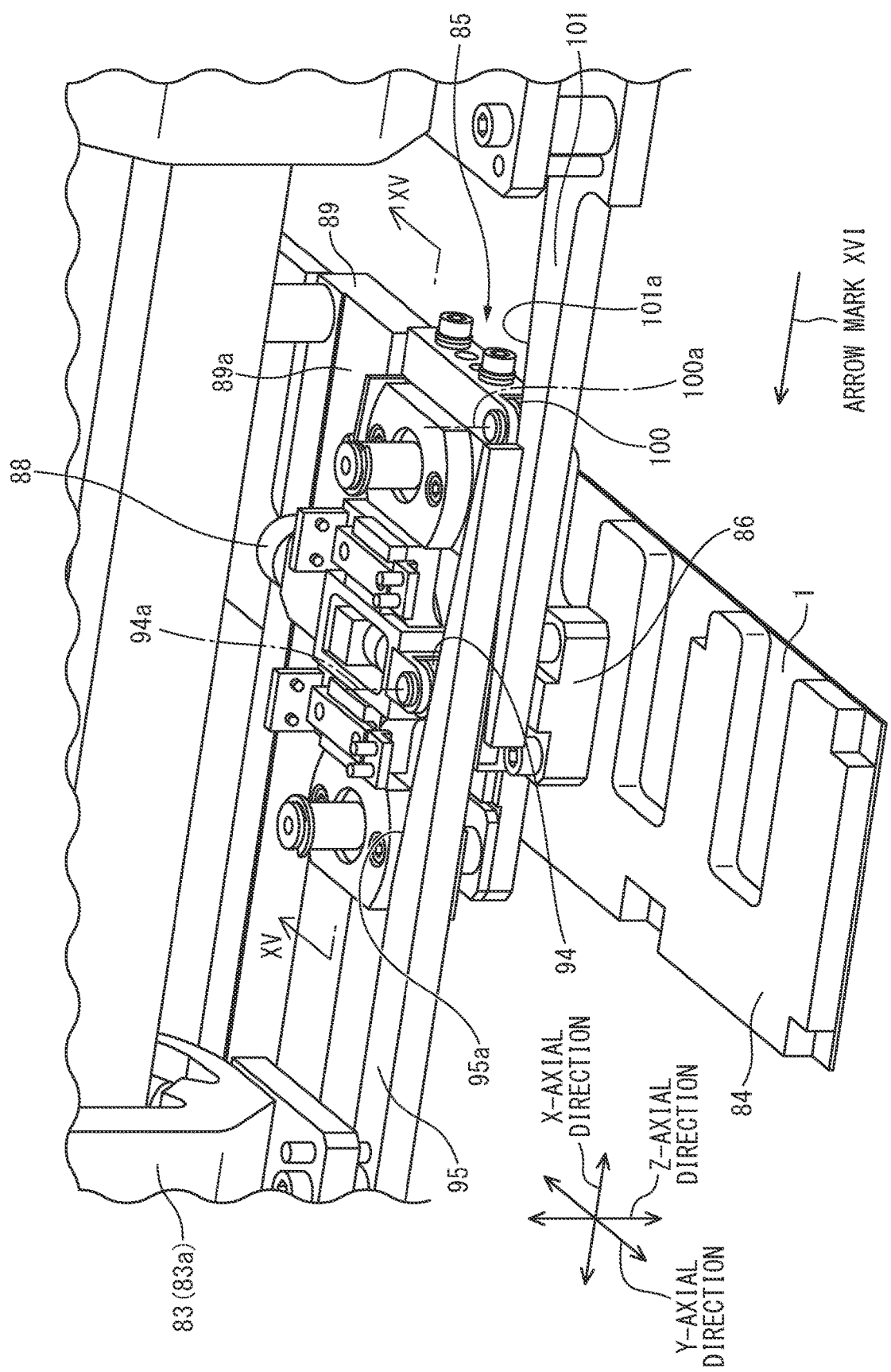
FIG. 14 is view omitting illustration of the main mover in FIG. 13 and showing enlarged a holder and coupler of the electrode placement device according to one embodiment of the present disclosure.
Figure 15:
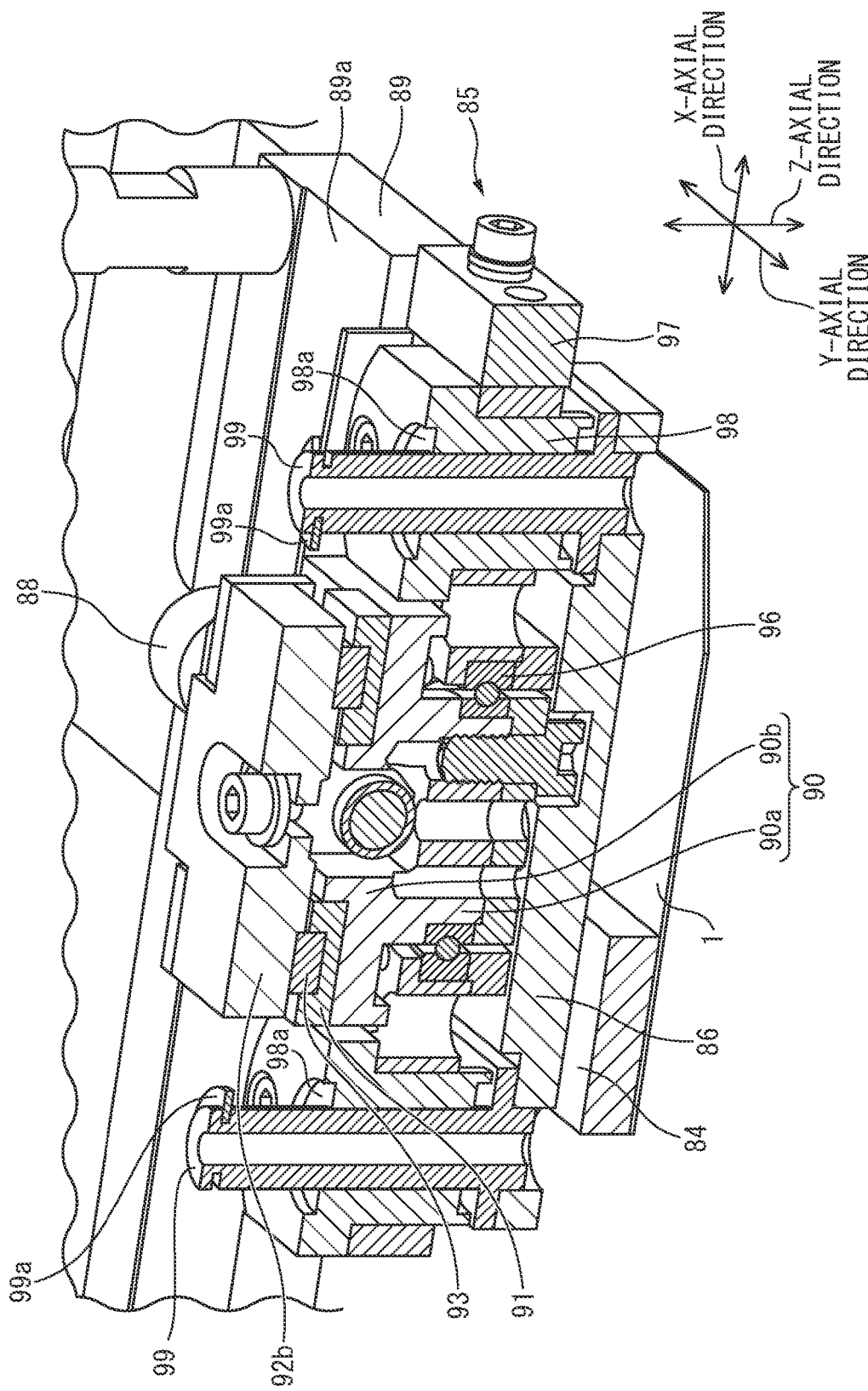
FIG. 15 is a cross-sectional view of a part along the line XV-XV of FIG. 14.
Figure 16:
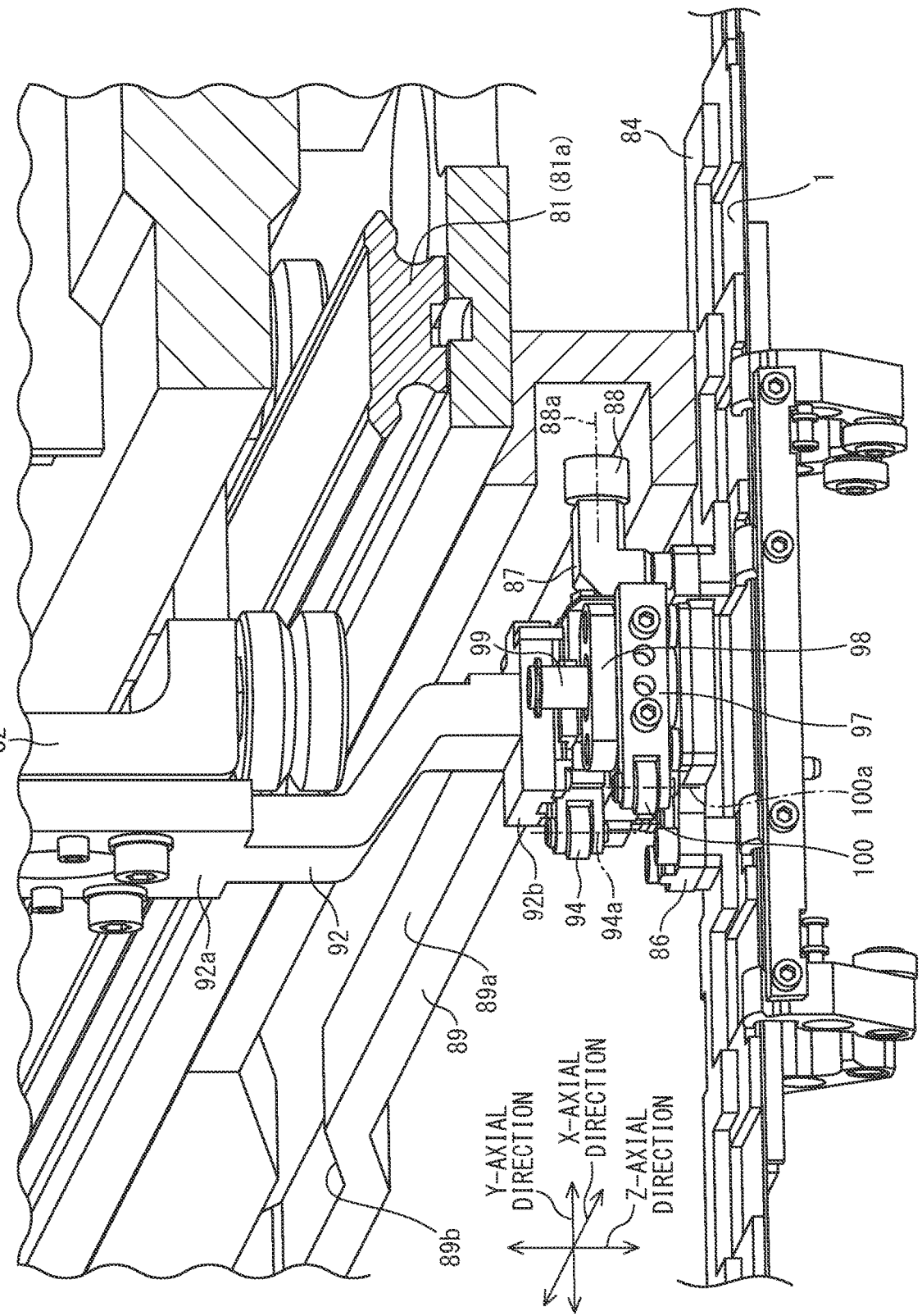
FIG. 16 is a lateral view of the coupler seen from an arrow XVI direction of FIG. 14.

FIG. 14 is a view omitting illustration of the main mover 82 in FIG. 13 and showing enlarged the holder 84 and coupler 85. FIG. 15 is a partial cross-sectional view of the part along the line XV-XV of FIG. 14. FIG. 16 is a view of the case of viewing the coupler 85 from the arrow XVI direction of FIG. 14.

As shown from FIG. 14 to FIG. 16, the coupler 85 is provided with a fixed plate 86 fixed to the surface of the center part of the holder 84.

Further, as shown in FIG. 16, at one end side of the fixed plate 86 in the longitudinal direction of the holder (side close to rail 81, in FIG. 16, right side), a holder support member 87 of an approximately L-shape extending from the fixed plate 86 upward in parallel with the X-axis direction, then extending to one end side in the longitudinal direction of the holder parallel with the Y-axis direction is fastened.

At the front end of the part of the holder support member 87 parallel with the Y-axis direction, a Z-axis use cam follower 88 able to rotate about the axis 88*a* is attached. This Z-axis use cam follower 88 is arranged on the cam face 89*a* of the Z-axis use cam 89 attached along the rail 81 below the rail 81.

In this way, the holder 84 becomes a state suspended downward from the Z-axis use cam 89 through the fixed plate 86 and holder support member 87. For this reason, the height position of the holder 84 in the vertical plane, that is, the height position of the holder 84 in the Z-axis direction, depends on the height position of the cam face 89*a* of the Z-axis use cam 89.

Further, the Z-axis use cam follower 88 attached to the front end of the holder support member 87 is designed to be able to move while rolling on the cam face 89*a* of the Z-axis use cam 89 together with the holder 84 if the holder 84 moves in the X-axis direction. For this reason, when changing the height position of the cam face 89*a* of the Z-axis use cam 89 in the Z-axis direction along the X-axis direction to make the holder 84 move in the X-axis direction together with the main mover 82, the height position of the holder 84 can be adjusted to a height corresponding to the height position of the cam face 89*a* of the Z-axis use cam 89 in the Z-axis direction.

In the present embodiment, as shown in FIG. 9, at the placement position of the electrode conveyance device C, the shape (height position) of the cam face 89*a* of the Z-axis use cam 89 is adjusted so that it is possible to make the holder 84 move downward in the Z-axis direction until a position enabling the sheet-shaped electrode 1 to be placed on the conveyor plate 20. Specifically, the inclined surface 89*b* is formed so that the holder 84 can be made to move down in the Z-axis direction right before the placement position.

Next, as shown in FIG. 15, at the top surface of the fixed plate 86, a linear movement base 90 having a columnar part 90*a* and a rectangular part 90*b* is placed.

On the top surface of the linear movement base 90, that is, the top surface of the rectangular part 90*b*, a pair of linear rail guides 91 extending in parallel with the Y-axis direction are fixed. At the linear rail guides 91, linear rails 93 are attached fixed to the rear surfaces of end parts 92*b* of the suspended members 92 (see FIG. 13 and FIG. 16) with end parts 92*a* (see FIG. 13 and FIG. 16) fastened to the main mover 82. Due to this, it becomes possible for the linear movement base 90 to move along the linear rails 93 in the Y-axis direction.

Further, as shown in FIG. 16, at the side surface of the other end side of the rectangular part 90*b* of the linear movement base 90 in the longitudinal direction of the holder (side separated from rail 81, in FIG. 16, the left side), a Y-axis use cam follower 94 able to rotate about an axis 94*a* is attached. Further, as shown in FIG. 13 and FIG. 14, this Y-axis use cam follower 94 is pressed by a biasing member (not shown) against the cam face 95*a* of the Y-axis use cam 95 fastened to the first sub mover 83*a*.

The Y-axis use cam 95 is a rod-shaped member extending from the first sub mover 83*a* toward the main mover 82 side in parallel with the X-axis direction. The cam face 95*a* is shaped inclined to the other end side in the longitudinal direction of the holder (side separated from rail) the further toward the main mover 82 side. Due to this, the operation control device E can control the first sub mover 83*a* to change the distance between the first sub mover 83*a* and the main mover 82 to thereby change the position of contact of the cam face 95*a* of the Y-axis use cam 95 and Y-axis use cam follower 94 in the Y-axis direction and make the linear movement base 90 move along the linear rails 93 in the Y-axis direction.

In the present embodiment, as shown in FIG. 13, when the Y-axis use cam follower 94 is positioned at the center position P1 in the longitudinal direction of the cam face 95*a* of the Y-axis use cam 95, the shape of the cam face 95*a* (angle of inclination) is adjusted so that the amounts of movement of the holder 84 in both directions of the Y-axis direction become zero.

Next, as shown in FIG. 15, at the columnar part 90*a* of the linear movement base 90, a rotary base 97 is attached through ball bearings 96 so as to be able to rotate about the columnar part 90*a* of the linear movement base 90. That is, the rotary base 97 is attached through the ball bearings 96 to the columnar part 90*a* of the linear movement base 90 so that its center of rotation becomes the center of the columnar part 90*a* of the linear movement base 90.

The rotary base 97 extends from the columnar part 90*a* of the linear movement base 90 toward the two sides in the short direction of the holder. At the two end parts of the rotary base 97 at the short direction of the holder, shaft insertion parts 98 are respectively formed. Further, at the two end parts of the fixed plate 86 in the short direction of the holder, a pair of guide shafts 99 extending in parallel with the Z-axis direction and functioning as guides when the holder 84 moves in the Z-axis direction are fastened. The guide shafts 99 are respectively inserted into the shaft insertion parts 98 of the rotary base 97 so as to be able to move in the Z-axis direction relative to the rotary base 97.

Due to this, the rotary base 97 is made to rotate about the columnar part 90*a* of the linear movement base 90, whereby the holder 84 can be made to rotate about the Z-axis together with the guide shafts 99 and fixed plate 86. Further, by making the linear movement base 90 move along the linear rails 93 in the Y-axis direction, the holder 84 can be made to move in the Y-axis direction together with the rotary base 97, guide shafts 99, and fixed plate 86.

Note that, at the front end parts of the guide shafts 99, stoppers 99*a* are provided for abutting against the top surfaces 98*a* of the shaft insertion parts 98 when the holder 84 moves downward in the Z-axis direction and restrict the holder 84 from moving downward in the Z-axis direction by more than a certain amount.

Further, as shown in FIG. 16, at one end side of the rotary base 97 in the short direction of the holder and the other end side in the longitudinal direction of the holder (side separated from the rail 81), a Z-axis use cam follower 100 able to rotate about the axis 100*a* is attached. Further, as shown in FIG. 13 and FIG. 14, this Z-axis use cam follower 100 is pressed by a biasing member (not shown) against the cam face 101*a* of the Z-axis use cam 101 fixed to the second sub mover 83*b*.

The Z-axis use cam 101 is a rod-shaped member extending from the second sub mover 83*b* toward the main mover 82 side in parallel with the X-axis direction. The cam face 101*a* forms a semicircular shape curved so as to be recessed to the inside. Due to this, the operation control device E can control the second sub mover 83*b* to change the distance between the second sub mover 83*b* and the main mover 82 and thereby make the rotary base 97 rotate around the Z-axis along the shape of the cam face 101*a*.

In the present embodiment, as shown in FIG. 13, when the Z-axis use cam follower 100 is positioned at the center position P2 in the longitudinal direction of the cam face 10*a* of the Z-axis use cam 101, the shape (radius of curvature) of the cam face 101*a* of the Z-axis use cam 101 is adjusted so that the amount of rotation of the holder 84 about the Z-axis becomes zero.

Returning to FIG. 9, the correction and conveyance device 80 is for example provided at the other end side in the longitudinal direction with a camera 102 attached to the rail 81 above the magazine placement part so as to be able to capture an image of a sheet-shaped electrode 1 transferred from the transfer plate 71 to the holder 84. The image captured by the camera 102 is sent to the operation control device E.

The operation control device E calculates the degree of offset from the reference position of the sheet-shaped electrode 1 transferred to the holder 84 based on the image of the sheet-shaped electrode 1 captured by the camera 102. In other words, it calculates correction amounts (later explained offset amount "y" and offset angle θ) for correcting the sheet-shaped electrode 1 transferred to the holder 84 to the reference position. The correction amounts are calculated after the sheet-shaped electrode 1 is transferred to the holder 84, then the main mover 82 is made to move to the conveyor position.

FIG. 17 is a view explaining a method of calculation of correction amounts for correcting a sheet-shaped electrode 1 transferred to the holder 84 to a reference position.

In the present embodiment, first, as shown in FIG. 17(A), the offset angle θ of the sheet-shaped electrode 1 about the Z-axis from the reference position shown by the one-dot chain line is calculated based on the image (solid line) of one end side of the sheet-shaped electrode 1 in the longitudinal direction captured by the camera 102. Further, the position of the sheet-shaped electrode 1 is corrected so that the offset angle θ becomes zero as shown by the broken line in FIG. 17(B). The offset amount "y" of the sheet-shaped electrode 1 from the reference position shown by the one-dot chain line is calculated.

Further, the operation control device E controls the first sub mover 83*a* to change the distance between the first sub mover 83*a* and the main mover 82 so that the offset amount "y" of the sheet-shaped electrode 1 becomes zero. That is, the operation control device E changes the contact position of the Y-axis use cam follower 94 and the cam face 95*a* of the Y-axis use cam 95 from P1 so that the offset amount "y" of the sheet-shaped electrode 1 becomes zero.

Further, the operation control device E controls the second sub mover 83*b* so as to change the distance between the second sub mover 83*b* and the main mover 82 so that the offset angle θ of the sheet-shaped electrode becomes zero. That is, the operation control device E changes the contact position of the Z-axis use cam follower 100 and the cam face 101*a* of the Z-axis cam 101 from P2 so that the offset angle θ of the sheet-shaped electrode 1 becomes zero.

Due to this, it is possible to place the sheet-shaped electrode 1 on the conveyor plate 20 in the state where the position of the sheet-shaped electrode 1 picked up and held on the holder 84 is corrected to the reference position shown by the one-dot chain line. That is, at the placement position, the sheet-shaped electrode 1 can be placed at a suitable position on the conveyor plate of the electrode conveyance device C.

Next, referring to FIG. 18 and FIG. 19, the method of placement of a sheet-shaped electrode 1 by the electrode placement device B will be explained.

First, referring to FIG. 18, the operation of the electrode placement device B being used so that the sheet-shaped electrode 1 is taken out from inside the magazine Z and is transferred to the holder 84 will be explained. Note that FIG. 18 schematically illustrates plan views and front views of the sheet-shaped electrodes 1 stacked in the magazine Z, restraining blade 62, transfer plates 71, plate adjustment mechanisms 72, and holders.

FIG. 18(A) shows the clamped state where a sheet-shaped electrode 1 stacked inside the magazine Z is restrained by the restraining part 63 of the restraining blade 62 from above in the stacking direction. At the time of this restrained state, the transfer plate 71 is rendered a horizontal state and placed above the sheet-shaped electrode 1 by the plate adjustment mechanism 72.

From the state shown in FIG. 18(A), the transfer plate 71 is made to descend by the plate adjustment mechanism 72 while holding the horizontal state. Due to this, the topmost layer sheet-shaped electrode 1 stacked inside the magazine Z by the transfer plate 71 is restrained. After that, the shaft 61 of the restraining device 60 is made to rotate counterclockwise by about 45 degrees, whereby the restraining part 63 of the restraining blade 62 is made to retract from the sheet-shaped electrode 1 and rendered the state shown in FIG. 18(B).

Figure 18:
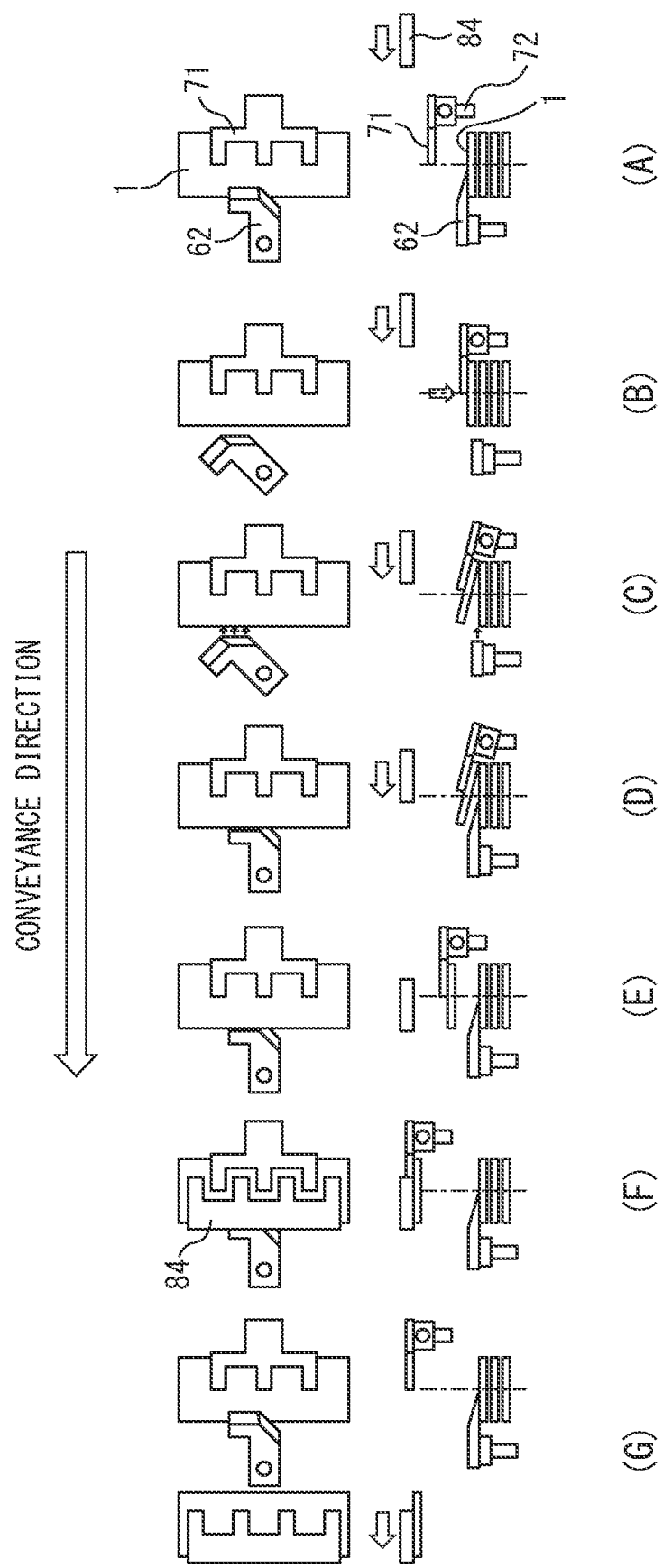
FIG. 18 is a view for explaining a method of placement of a sheet-shaped electrode of the electrode placement device according to one embodiment of the present disclosure.
Figure 19:
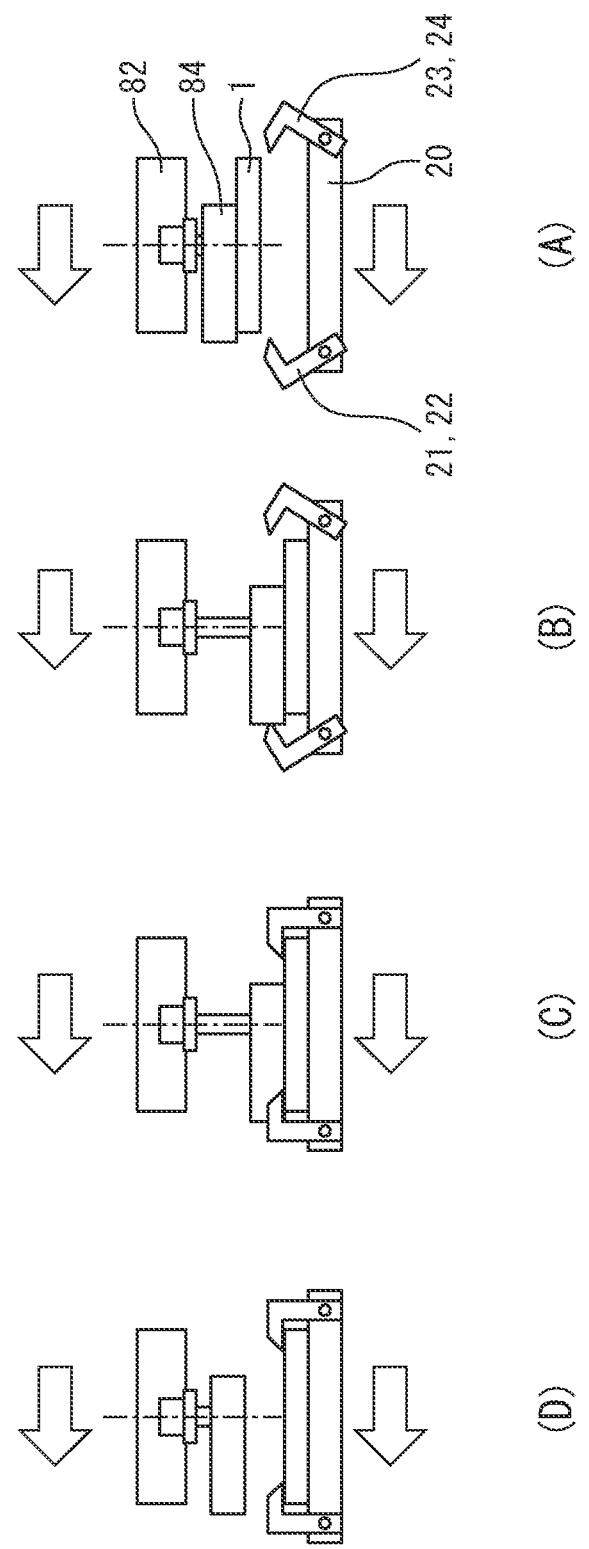
FIG. 19 is a view for explaining a method of placement of a sheet-shaped electrode of the electrode placement device according to one embodiment of the present disclosure.

When becoming the state shown in FIG. 18(B), next, as shown in FIG. 18(C), the transfer plate 71 is made an inclined state by the plate adjustment mechanism 72. Due to this, one end side of the sheet-shaped electrode 1 in the short direction (left side in FIG. 18) is lifted upward and the other end side in the short direction (right side in FIG. 18) is pushed down by the transfer plate 71. Further, at the same time as rendering the transfer plate 71 an inclined state, separation air is discharged from the air discharge ports 65 of the restraining blade 62 made to retract from the sheet-shaped electrode 1. Due to this, separation of the topmost layer sheet-shaped electrode 1 picked up and held at the transfer plate 71 from the sheet-shaped electrodes 1 in the state stacked inside the magazine Z can be promoted.

After separation air is discharged from the air discharge ports 65 of the restraining blade 62, as shown in FIG. 18(D), the shaft 61 of the restraining device 60 is made to contract while being made to rotate clockwise by about 45 degrees and is returned to the restrained state. Due to this, the sheet-shaped electrodes 1 stacked below the topmost layer sheet-shaped electrode 1 picked up and held at the transfer plate 71 are restrained by the restraining part 63 of the restraining blade 62 from above in the stacking direction.

When becoming the state shown in FIG. 18(D), next, as shown in FIG. 18(E), the transfer plate 71 is returned to the horizontal state by the plate adjustment mechanism 72 while being raised. As shown in FIG. 18(A) to FIG. 18(E), in the present embodiment, while the topmost layer sheet-shaped electrode 1 is being lifted upward together with the transfer plate 71, the sheet-shaped electrodes 1 stacked in the magazine Z are in a state constantly restrained by the restraining blade 62 or transfer plate 71 from the top side in the stacking direction. For this reason, the sheet-shaped electrodes 1 stacked inside the magazine Z can be kept from ending up tipping over inside the magazine Z.

Further, as shown in FIG. 18(F), the transfer plate 71 is made to rise by the plate adjustment mechanism 72 to a position facing the holder 84 of the correction and conveyance device 80 and the sheet-shaped electrode 1 is transferred from the transfer plate 71 to the holder 84. Note that, the pick up and holding action of the transfer plate 71 is released after the pickup and holding action of the sheet-shaped electrode 1 by the holder 84 is started.

After the holder 84 finishes picking up and holding the sheet-shaped electrode 1, the camera 102 is used to capture an image of the other end side of the sheet-shaped electrode 1 in the longitudinal direction, then, as shown in FIG. 18(G), the main mover 82 is made to move together with the holder 84 toward the placement position. At this time, in the present embodiment, when the holder 84 and the transfer plate 71 face each other inside a horizontal plane, the holder and the transfer plate 71 intermesh with each other in a comb tooth fashion, so without changing the height position of the transfer plate 71 by the plate adjustment mechanism 72, it is possible to make the main mover 82 immediately move together with the holder 84 toward the placement position after being captured by the camera 102.

Further, while making the main mover 82 move toward the placement position, correction amounts (offset amount "y" and offset angle θ) are calculated for correcting the sheet-shaped electrode 1 transferred to the holder 84 to the reference position based on the image of the sheet-shaped electrode 1 captured by the camera 102. The first sub mover 83a and second sub mover 83b are made to run alongside the main mover 82 while the distances between the movers 83a and 83b and the main mover 82 are changed based on the calculated correction amounts so as to correct the position of the sheet-shaped electrode 1 held at the holder 84.

Next, referring to FIG. 19, the operation when the sheet-shaped electrode 1 transferred to the holder 84 and corrected in position by the electrode placement device B is placed on a conveyor plate 20 of the electrode conveyance device C will be explained. Note that FIG. 19 schematically shows the conveyor plates 20, clamps 21, 22, 23, and 24 attached to the conveyor plates 20, main movers 82, holders 84 attached to the main movers 82, and sheet-shaped electrodes 1 picked up and held by the holders 84.

FIG. 19(A) shows the state where a holder 84 picking up and holding a sheet-shaped electrode 1 and corrected in position is made to move by a main mover 82 to the placement position of the electrode conveyance device C. At this time, the operation control device E is used to control the main mover 82 and the mover 12 so that the mover 12 of the electrode conveyance device C runs below the main mover 82 together with the main mover 82.

Further, as shown in FIG. 19(B), while the main mover 82 is being moved to the transfer position, the holder 84 is made to move downward in the Z-axis direction until a position where the sheet-shaped electrode 1 can be placed on a conveyor plate 20 of the mover 12 of the electrode conveyance device C.

Further, as shown in FIG. 19(C), when the sheet-shaped electrode 1 is placed on the conveyor plate 20 of the mover 12 of the electrode conveyance device C, clamps 21, 22, 23, and 24 of the conveyor plate 20 are used to hold the sheet-shaped electrode 1, then the pickup and holding action of the sheet-shaped electrode 1 by the holder 84 is released and, as shown in FIG. 19(D), the holder 84 is made to move upward in the Z-axis direction in the process of the main mover 82 moving from the placement position.

According to the present embodiment explained above, there is provided an electrode placement device B (placement device) for taking out and conveying a topmost layer sheet-shaped electrode 1 from among a plurality of sheet-shaped electrodes 1 (sheet members) set in a prestacked state and for transferring the taken out sheet-shaped electrode 1 to a conveyor plate 20 (placement station) arranged below a conveyance route in a vertical plane, which placement device comprising a rail 81 extending along the conveyance route, a main mover 82 of a linear motor running on the rail 81, a sub mover 83 of a linear motor running on the rail 81 alongside the main mover 82, a holder 84 configured to be able to hold a sheet-shaped electrode 1, a coupler 85 coupling the main mover 82 and the holder 84 so as to be able to change a position of the holder 84 in a horizontal plane, a transfer device 70 taking out the topmost layer sheet-shaped electrode 1 from the plurality of sheet-shaped electrodes 1 and transferring it to the holder 84, a camera 102 (position detection device) detecting a holding position of a sheet-shaped electrode 1 transferred to the holder 84 and held by the holder 84, a cam (Y-axis use cam 95 or Z-axis use cam 101) fastened to the sub mover 83, extending toward the main mover 82 side, and contacting a cam follower (Y-axis use cam follower 94 or Z-axis use cam follower 100) provided at the coupler 85, and an operation control device E making the main mover 82 and sub mover 83 run while changing a relative distance of the sub mover 83 with respect to the main mover 82 to change a contact position of the cam and cam follower based on the holding position of the sheet-shaped electrode 1 detected by the camera 102 and thereby change a position of the holder 84 in a horizontal plane to correct the holding position of the sheet-shaped electrode 1 held at the holder 84 to a preset reference position.

In the present embodiment, the conveyor plate 20 (placement station) is set on the mover 12 of a linear motor running on a separate rail 10 set below the rail 81 so that it partially faces the rail 81.

Due to this, it is possible to convey a sheet-shaped electrode 1 held by a holder 84 by a main mover 82 of a linear motor at a high speed. Further, during conveyance by the main mover 82, it is possible to use a sub mover 83 of a linear motor running alongside the main mover 82 to correct the holding position of the sheet-shaped electrode 1 held at the holder 84. Therefore, it is possible to convey the sheet-shaped electrode 1 held at the holder 84 at a high speed while correcting the holding position during conveyance to transfer it to a suitable position of the conveyor plate 20. For this reason, the sheet-shaped electrode 1 placed on the conveyor plate 20 can, for example, be suitably processed even when performing processing for cutting the tab, processing for insulating the ends, processing for attaching a positive electrode foil, or other various processing where precision is demanded.

Further, in the present embodiment, the coupler 85 is configured to be able to make the holder 84 move in the Y-axis direction (first direction) perpendicularly intersecting the direction of advance of the main mover 82 in a horizontal plane and to be able to make the holder 84 rotate in the horizontal plane. Further, the sub mover 83 is comprised of a first sub mover 83a and second sub mover 83b. The first sub mover 83a is provided with an Y-axis cam 95 (first cam) fastened to the first sub mover 83a, extending toward the main mover 82 side, and contacting a Y-axis use cam follower 94 (first cam follower) provided at the coupler 85, while the second sub mover 83b is provided with a Z-axis use cam 101 (second cam) fastened to the second sub mover 83b and extending toward the main mover 82 side and against which a Z-axis use cam follower 100 (second cam follower) provided at the coupler 85 is pressed. Further, the operation control device E is used to change the relative distances of the first sub mover 83a and second sub mover 83b with respect to the main mover 82 to change the contact position of the Y-axis use cam follower 94 and Y-axis cam 95 and the contact position of the Z-axis use cam follower 100 and Z-axis use cam 101 and thereby make the holder 84 move in the Y-axis direction and rotate to change the position of the holder 84 in a horizontal plane.

In this way, according to the present embodiment, the holder 84 can be made to move in the Y-axis direction and rotate to correct the holding position of the sheet-shaped electrode 1 held at the holder 84, so the holding position can be precisely corrected to the reference position.

Further, the placement method of a sheet-shaped electrode 1 performed by an electrode placement device B according to the present embodiment explained above is a placement method for taking out and conveying a topmost layer sheet-shaped electrode 1 from among a plurality of sheet-shaped electrodes 1 (sheet members) set in a prestacked state and and transferring the taken out sheet-shaped electrode 1 to a conveyor plate 20 (carrying station) arranged below that conveyance route in a vertical plane, which placement method comprising a first process of taking out a topmost layer sheet-shaped electrode 1 from a plurality of sheet-shaped electrodes 1 and transferring it to a holder 84 attached to a main mover 82 running on a rail 81, a second process of detecting a position of the sheet member transferred to the holder 84 and calculating a position correction amount for correcting offset of the sheet member transferred to the holder 84 from a reference position based on the detected position of the sheet-shaped electrode 1, and a third process of using a sub mover 83 of a linear motor running alongside the main mover 82 on the rail 81 to change the position of the holder 84 in a horizontal plane based on the correction amount so as to correct the position of the sheet-shaped electrode 1 transferred to the holder 84 to the reference position while conveying the sheet-shaped electrode 1 transferred to the holder 84 by the main mover 82 before transferring it to the conveyor plate 20.

Based on these processes, it is possible to convey a sheet-shaped electrode 1 held at a holder 84 at a high speed while correcting the holding position during conveyance so as to transfer it to a suitable position of the conveyor plate 20. For this reason, even when processing a sheet-shaped electrode 1 transferred onto a conveyor plate 20 to for example cut the tab or insulate the end parts, attach positive electrode foil, and perform various other types of processing where precision is demanded, it is possible to suitably perform these processings.

Further, in working this placement method, in the present embodiment, the sub mover 83 is provided with a cam (Y-axis use cam 95 or Z-axis use cam 101) fastened to the sub mover 83, extending toward the main mover 82 side, and contacting a cam follower (Y-axis use cam follower 94 or Z-axis use cam follower 100) provided at a coupler 85 coupling the main mover 82 and the holder 84 so as to be able to change the position of the holder 84 in a horizontal plane. In the above-mentioned third process, specifically the relative distance of the sub mover 83 with respect to the main mover 82 is made to change to make the contact position of the cam and the cam follower change and thereby make the position of the holder 84 in a horizontal plane change.

Above, embodiments of the present disclosure were explained, but the above embodiments only show some of the examples of application of the present disclosure and are not meant to limit the technical scope of the present disclosure to the specific configurations of the above embodiments.

For example, in the above embodiments, the two sub movers 83, that is, the first sub mover 83a and second sub mover 83b, running on the rail 81 alongside the main mover 82 were used to correct the holding position of the sheet-shaped electrode 1 held at the holder 84, but a single sub mover 83 may also be used to make the holder 84 move in the Y-axial direction or rotate about the Z-axis so as to correct the holding position of the sheet-shaped electrode 1 held by the holder 84.

The invention claimed is:

1. A placement device configured to take out and convey a topmost layer sheet member from among a plurality of sheet members set in a pre-stacked state and to place the taken out sheet member at a placement station arranged below a conveyance route in a vertical plane, which placement device comprising:
   a rail configured to extend along the conveyance route;
   a main mover of a linear motor configured to run on the rail;
   a sub mover of a linear motor configured to run on the rail alongside the main mover;
   a holder configured to be able to hold a sheet member;
   a coupler configured to couple the main mover and the holder so as to be able to change a position of the holder in a horizontal plane;
   a transfer device configured to take out the topmost layer sheet member from the plurality of sheet member and transfer the topmost layer sheet member to the holder;
   a position detection device configured to detect a position of the sheet member transferred to the holder and held by the holder;
   a cam fastened to the sub mover, extending toward the main mover side, and contacting a cam follower provided at the coupler; and
   an operation control device configured to make the main mover and sub mover run while changing a relative distance of the sub mover with respect to the main mover to change a contact position of the cam and cam follower based on the position of the sheet member detected by the position detection device and thereby change a position of the holder in a horizontal plane to correct offset from the reference position of the sheet member held at the holder.

2. The placement device according to claim 1, wherein the coupler is configured to be able to make the holder move in a first direction perpendicular to a direction of advance of the main mover in a horizontal plane, and the operation control device is configured to change the contact position of the cam and the cam follower to make the holder move in the first direction and thereby change the position of the holder in a horizontal plane.

3. The placement device according to claim 2, wherein the coupler is configured to be able to make the holder rotate in a horizontal plane, and the operation control device is configured to change the contact position of the cam and the cam follower to make the holder rotate and thereby change the position of the holder in a horizontal plane.

4. The placement device according to claim 1, wherein the coupler is configured to be able to make the holder move in a first direction perpendicular to a direction of advance of the main mover in a horizontal plane and to be able to make the holder rotate in the horizontal plane,
the sub mover is comprised of a first sub mover and a second sub mover,
the first sub mover is provided with a first cam fastened to the first sub mover, extending toward the main mover side, and contacting a first cam follower provided at the coupler,
the second sub mover is provided with a second cam fastened to the second sub mover, extending toward the main mover side, and contacting a second cam follower provided at the coupler,
the operation control device is configured to change relative distances of the first sub mover and the second sub mover with respect to the main mover to change a contact position of the first cam and the first cam follower and a contact position of the second cam and the second cam follower to thereby make the holder move in the first direction and rotate to change the position of the holder in a horizontal plane.

5. The placement device according to claim 1, wherein the placement station is set on a mover of a linear motor running on another rail set below the rail so as to partially face the rail.

6. A placement method for taking out and conveying a topmost layer sheet member from among a plurality of sheet members placed in a pre-stacked state and for placing the taken out sheet member at a placement station arranged below a conveyance route in a vertical plane, which placement method comprising,
a first process of taking out the topmost layer sheet member from the plurality of sheet members and transferring the sheet member to a holder attached to a main mover of a linear motor running on a rail,
a second process of detecting a position of the sheet member transferred to the holder and calculating a position correction amount for correcting offset from a reference position of the sheet member transferred to the holder based on the detected position of the sheet member, and
a third process of conveying the sheet member transferred to the holder by the main mover and placing the sheet member at the placement station during which changing a position of the holder in a horizontal plane based on the position correction amount by a sub mover of a linear motor running on the rail alongside the main mover to thereby correct the position of the sheet member transferred to the holder to the reference position.

7. The placement method according to claim 6 wherein the sub mover comprises a cam fastened to the sub mover, extending toward the main mover side, and contacting a cam follower provided at a coupler coupling the main mover and the holder so as to be able to change the position of the holder in a horizontal plane, and
the third process comprises changing a relative distance of the sub mover with respect to the main mover to change a contact position of the cam and cam follower and thereby change a position of the holder in a horizontal plane.

* * * * *